United States Patent [19]

Kasamatsu et al.

[11] Patent Number: 5,596,400
[45] Date of Patent: Jan. 21, 1997

[54] IMAGE FORMING APPARATUS INCLUDING DEVICE FOR SETTING ORIGINAL DOCUMENTS ON A DOCUMENT PLATEN

[75] Inventors: Toru Kasamatsu; Shigio Ogino, both of Toyokawa; Masaaki Goto, Toyohashi, all of Japan

[73] Assignee: Minolta Co., Ltd., Osaka, Japan

[21] Appl. No.: 415,707

[22] Filed: Apr. 3, 1995

[30] Foreign Application Priority Data

Apr. 5, 1994 [JP] Japan ...................................... 6-092989

[51] Int. Cl.$^6$ ...................................................... G03G 15/01
[52] U.S. Cl. .............................. 399/45; 358/501; 399/368
[58] Field of Search .............................. 355/311, 326 R, 355/327, 309; 358/401, 501, 449

[56] References Cited

U.S. PATENT DOCUMENTS

| | | | |
|---|---|---|---|
| 4,712,906 | 12/1987 | Bothner et al. | 355/3 TR |
| 4,727,401 | 2/1988 | Partilla et al. | 355/14 SH |
| 5,144,387 | 9/1992 | Tanaka et al. | 355/326 R |
| 5,159,390 | 10/1992 | Imaizumi | 355/212 |

FOREIGN PATENT DOCUMENTS

0411918A2  2/1991  European Pat. Off. .

*Primary Examiner*—Joan H. Pendegrass
*Attorney, Agent, or Firm*—Brinks Hofer Gilson & Lione

[57] ABSTRACT

The maximum number of documents placeable on a document platen may be detected by comparing the document size and document platen size. Then, a number of copy sheets equal to the maximum number of documents is chucked on a transfer drum. When the documents containing color regions and document that does not contain color regions are mixed among the plurality of documents placed on a document platen, a single scanning operation is executed for all document regions for developing a black toner, and three scanning operations are executed for documents containing color regions for developing a cyan, magenta and yellow toner.

21 Claims, 19 Drawing Sheets

Fig. 17 (A) PRIOR ART
Fig. 17 (B) PRESENT INVENTION
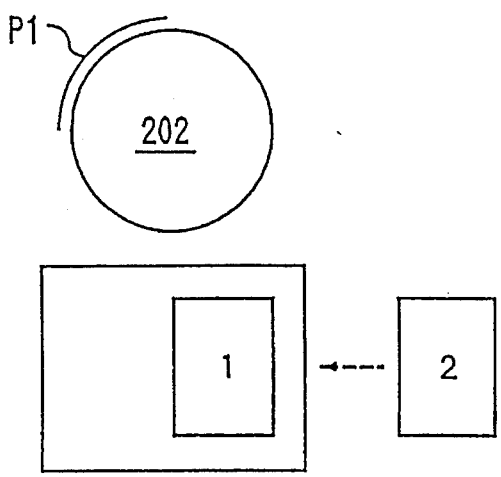
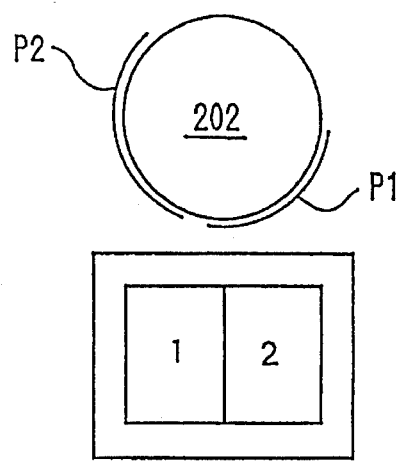
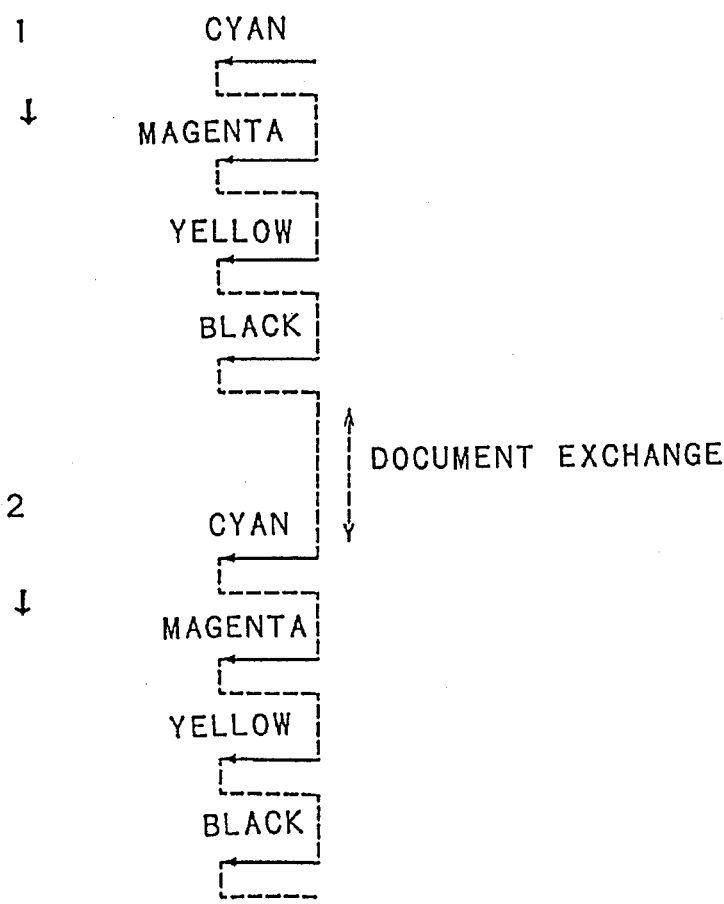

Fig. 18
A   (B/W)×(B/W)
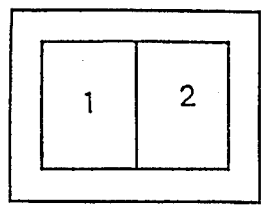
BLACK
Fig. 18
B   (B/W)×COLOR
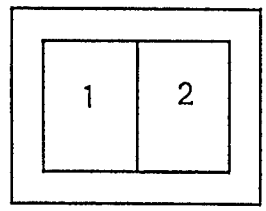
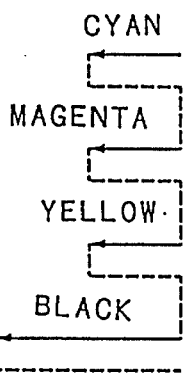
Fig. 18
C   COLOR×(B/W)
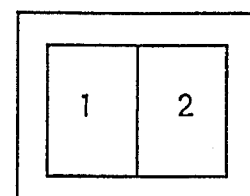
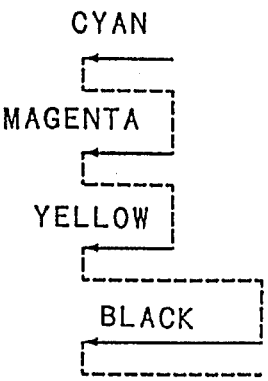
Fig. 19
A   NON-BOOK DIVISIONAL MODE
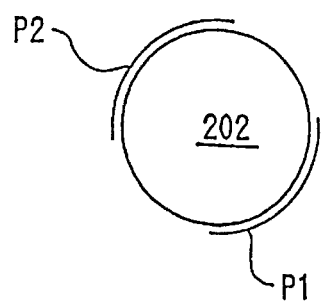
Fig. 19
B   BOOK DIVISIONAL MODE
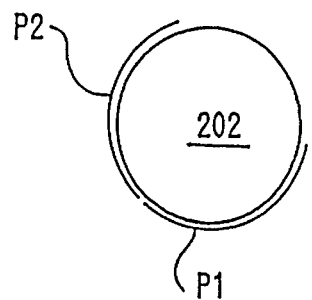

Fig. 20
(A) BOOK: COLOR×COLOR
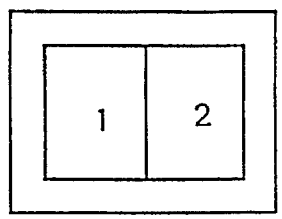
PRESCANNING
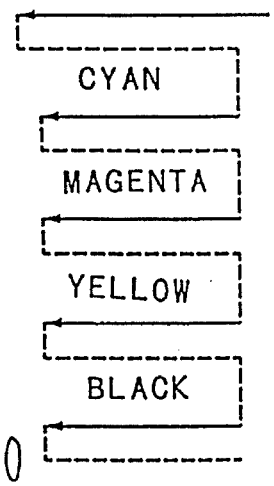
CYAN
MAGENTA
YELLOW
BLACK
Fig. 20
(B) BOOK: (B/W)×(B/W)
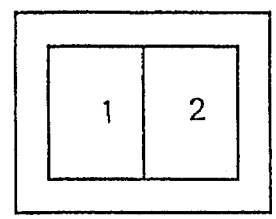
PRESCANNING
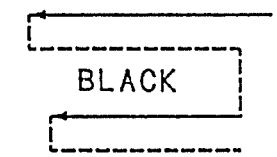
BLACK
Fig. 20
(C) BOOK: (B/W)×COLOR
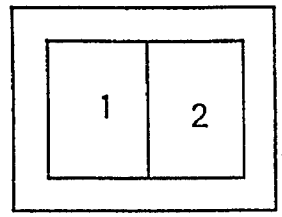
PRESCANNING
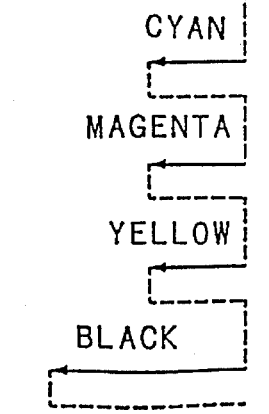
CYAN
MAGENTA
YELLOW
BLACK
Fig. 20
(D) BOOK: COLOR×(B/W)
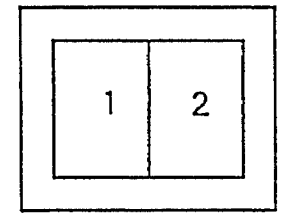
PRESCANNING
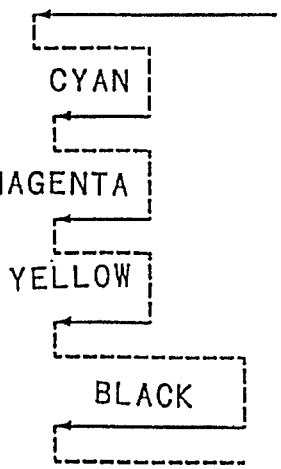
CYAN
MAGENTA
YELLOW
BLACK Fig. 21
(A) 2in1: COLOR×COLOR
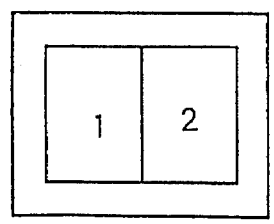
CYAN
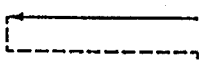
MAGENTA
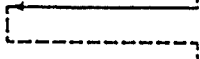
YELLOW
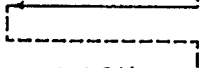
BLACK
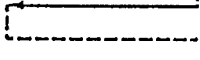
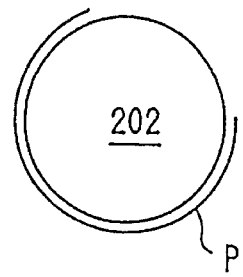
Fig. 21
(B) 2in1: (B/W)×(B/W)
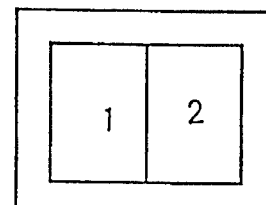
BLACK
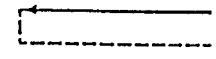
Fig. 21
(C) 2in1: (B/W)×COLOR
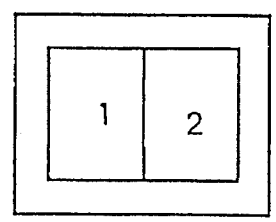
CYAN
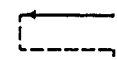
MAGENTA
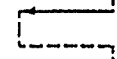
YELLOW
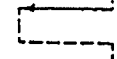
BLACK
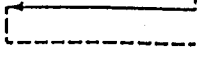
Fig. 21
(D) 2in1: COLOR×(B/W)
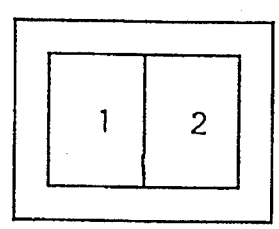
CYAN
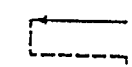
MAGENTA
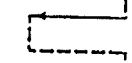
YELLOW
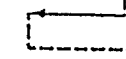
BLACK
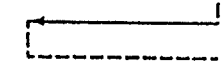

IMAGE FORMING APPARATUS INCLUDING DEVICE FOR SETTING ORIGINAL DOCUMENTS ON A DOCUMENT PLATEN

BACKGROUND OF THE INVENTION

1. Field of the Invention

The present invention relates to an image forming apparatus, and specifically relates to an apparatus for reproducing the image of a document disposed on a document platen on a sheet supported on a transfer drum.

2. Description of the Related Art

FIG. 17A shows the copy process of a conventional color copying apparatus.

In this copying apparatus, a single sheet P1 is supported on transfer drum 202, and a single sheet color document is disposed on the document platen. A copying operation for two document sheets in this copying apparatus is accomplished by the following sequence.

The document image is first scanned for cyan color and a corresponding electrostatic latent image is formed on the surface of a photosensitive member not shown in the drawing, said latent image is developed by cyan toner, and transferred to sheet P1. Then, scanning, latent image formation, and development are accomplished for magenta color, and subsequently scanning, latent image formation, and development are accomplished for yellow color, whereupon, finally, scanning, latent image formation, and development are accomplished for black color. Thereafter, the document disposed on the document platen is exchanged, and a total of four scanning, latent image formation, and developing operations similar to those described above are accomplished for the exchanged document. Thus, the copying operation of two color document sheets is completed.

EP 411918 discloses an apparatus provided with a function for discriminating color document regions and black and white document regions of the various divisional regions of document disposed on a document platen. In this apparatus, when a book-type document is disposed on the document platen, each page of the open-faced book is discriminated as to whether or not it is a color page or a black and white page. When a color page is discriminated, color copying is executed, whereas when a black and white is discriminated, black and white copying is executed so as to prevent wasteful color copying of black and white pages.

U.S. Pat. No. 4,712,906 discloses an apparatus for forming electrostatic latent images corresponding to image information of two images in a row on the surface of a photosensitive member, which are sequentially developed with toner and subsequently sequentially transferred onto two sheets supported on a transfer drum.

The method shown in FIG. 17A is disadvantageous insofar as a long time is required until completion of the because time is required to scan each document separately as well as to exchange documents.

Although time for exchanging two document sheets is not required in the book-type document mode (a mode wherein two document sheets are presumed to be two pages of an open book) of the apparatus disclosed in EP 411918, scanning time is required to separately scan each page with the result that a long time is required to complete the copying operation.

The apparatus disclosed in U.S. Pat. No. 4,712,906 is constructed such that image information of two images is read out from an image memory, therefore requiring a large-capacity memory, and increasing the cost of the apparatus.

SUMMARY OF THE INVENTION

An object of the present invention is to reduce the time for scanning and document exchange in the overall operation, and reduce the total time required to complete the copying operation.

A further object of the present invention is to prevent overlapping of copy sheets in the transfer section when reproducing all document placed on a document platen on respective copy sheets via a single scan.

A still further object of the present invention is to achieve the aforesaid objects without using a large-capacity image memory.

The present invention provides an image forming apparatus which scans an original document by a scanner and transfers a scanned image onto a copy sheet, said image forming apparatus comprising, means for setting on a document platen a maximum number of document sheets placeable on said document platen, and a transfer member for supporting a number of copy sheets equal to said maximum number of document sheets placed on said document platen so as to form the image of the document onto the supported copy sheet.

The maximum number of documents placeable on a document platen may be detected by comparing the document size and document platen size. When all documents among a plurality of document pages placed on a document platen are discriminated as being documents that do not contain color regions, a scanner executes a single scanning operation for all document regions. On the other hand, when all documents among a plurality of document pages placed on a document platen are discriminated as being documents that contain color regions, a scanner executes four scanning operations for all document regions. When the document containing color regions and document that does not contain color regions are mixed among the plurality of documents placed on a document platen, a single scanning operation is executed for document that does not contain color regions and four scanning operations are execute for document containing color regions.

Accordingly, the present invention minimizes the time for document exchange and scan return in the total operation by scanning all documents on a document platen in a single operation. Further, the present invention minimizes the time required for image reproduction in the total operation by reproducing images on each copy sheet supported on a transfer drum in a single operation relative to the aforesaid scan. The present invention further prevents overlapping of copy sheets in the transfer section by supporting each copy sheet on a transfer drum.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

FIGS. 17A and B show the relationship between the documents placed on a document platen and the developing operation on the copy sheets FIG. 17A shows a conventional arrangement, and FIG. 17B shows the arrangement of the present invention;

FIG. 18 shows the relationship of the documents on the document platen and the developing operation on the copy sheet relative to FIG. 14;

FIGS. 19A and B illustrate the position of copy sheets chucked to transfer drum 202 FIG. 19A shows the positions in non-book divisional mode, and FIG. 19B shows the positions in the book divisional mode;

FIG. 20 shows the relationship between documents placed on a document platen and the developing process on the copy sheets relative to FIG. 15;

FIG. 21 shows the relationship between documents placed on a document platen and the developing process on the copy sheets relative to FIG. 16.

DETAILED DESCRIPTION OF THE PREFERRED EMBODIMENTS (1-1) Copying Apparatus Construction and Functions FIG. 1 shows the construction of an embodiment of a color copying apparatus.

Figure 1:
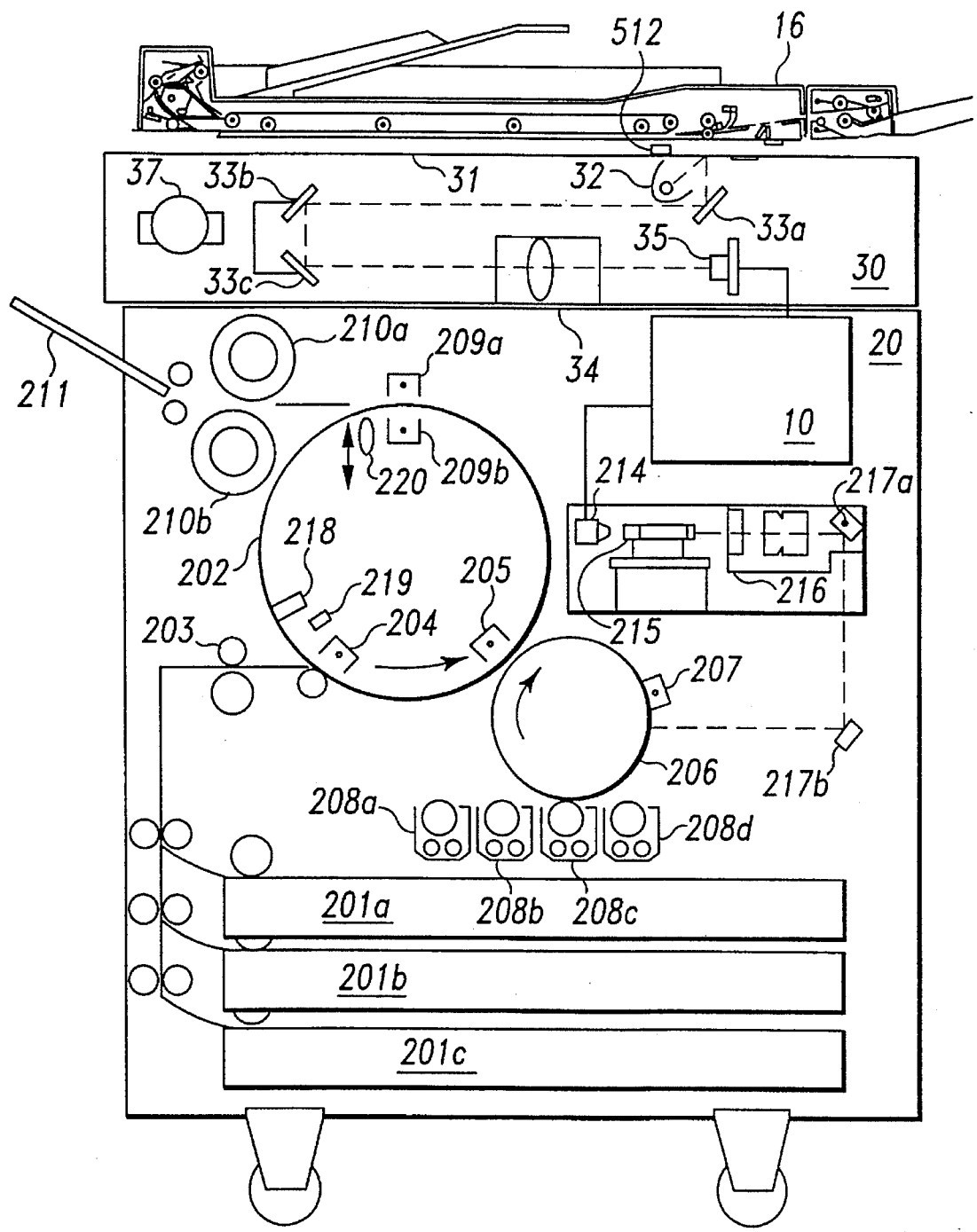
FIG. 1 is a plan view showing the construction of the apparatus of the present invention.

The copying apparatus in the drawing comprises image reader section 30 for generating image data by scanning documents disposed on document platen 31, and printer section 20 for forming on a copy sheet an image corresponding to said generated image data.

In image reader section 30, a document is set facing downward on document platen 31, optically scanned by movable scanner sections 32 and 33a–33c, and the light reflected from the exposed document is condensed by lens unit 34 so as to form an image on solid-state imaging sensor (charge-coupled device (CCD) sensor) 35. The aforesaid optical scanning is executed four times (cyan, magenta, yellow, and black hereinafter referred to as "C, M, Y, and Bk," respectively) when forming color images. Reference number 37 in the drawing refers to a motor for moving the aforesaid movable scanner sections 32 and 33a–33c.

In solid-state imaging sensor 35, electric signals are generated in accordance with the aforesaid reflected light, and said electric signals are transmitted to image process section 10. In image process section 10, image data are generated corresponding to said electric signals by a well known process. The generated image data are stored in an image memory as necessary.

The aforesaid image data are output to laser light generating unit 214 of printer section 20 by a timing for electrostatic latent image formation. Thus, laser light modulated by image data is emitted from laser light generating unit 214. The emitted laser light passes polygonal mirror 215, optical unit 216, folding mirrors 217a and 217b, and impinges photosensitive drum 206. Photosensitive drum 206 is charged by charger 207 in front of the impingement position, such that an electrostatic latent image corresponding to the image data is formed on the surface thereof by the impinging laser light. When forming color images, a total of four electrostatic latent image forming operations are performed for C, M, Y, and Bk latent images corresponding to the previously mentioned four optical scans. Image data generated in the image process section 10 may be controlled so as to be output directly to laser generating unit 214.

In printer section 20, after an electrostatic latent image formed on the surface of photosensitive drum 206 is developed with toner so as to be rendered visible, said toner image is transferred onto a copy sheet chucked on transfer drum 202. The transfer operation is accomplished by the operation of transfer charger 205. When forming color images, four transfer operations are performed for C, M, Y, and Bk toner images corresponding to the previously mentioned four electrostatic latent images. After the toner image transfer is completed, the copy sheet is separated from transfer drum 202 by the operation of separation chargers 209a and 209b and separation member 220, transported between fixing rollers 210a and 210b which perform an image fixing process via heat and pressure, and said copy sheet is subsequently discharged to discharge tray 211 outside the apparatus.

In the previously described process, a copy sheet is fed by a feed roller from within one of the paper cassettes 201a–201c in accordance with a specified size and orientation or a manual paper cassette table which setable optional size of sheets by operator (not shown FIG. 1), and is transported by a plurality of transport rollers to arrive at timing roller 203 where said copy sheet is temporarily stopped. Then, timing roller 203 is actuated with a predetermined timing (i.e., a timing determined by the relationship between the latent image forming operation and the toner developing operation), whereby the aforesaid copy sheet is delivered to transfer drum 202.

The copy sheet delivered to transfer drum 202 is chucked (i.e., electrostatically adhered) to the surface of transfer drum 202 via the action of electrostatic charger 204. The timing which determined the chucking at some position on transfer drum 202 of a copy sheet delivered from timing roller 203 is controlled by transfer drum shield sensor 218 so as to standardize the timing for passing photointerrupter 219. Feeding from timing roller 203 is successively performed when a plurality of copy sheets are chucked in line on the surface of transfer drum 202.

In the previously described process, a developing operation is realized by selectably moving in accordance with a sequence developing devices among cyan developing device 208a accommodating cyan toner, magenta developing device 208b accommodating magenta toner, yellow developing device 208c accommodating yellow toner, and black developing device 208d accommodating black toner to developing positions confronting the surface of photosensitive drum 206, and operating said developing device(s).

The direction of rotation of photosensitive drum 206 and transfer drum 202 are indicated by arrows in the drawing.

[1-2] Automatic Document Feeder (ADF) Construction and Functions

Figure 2:
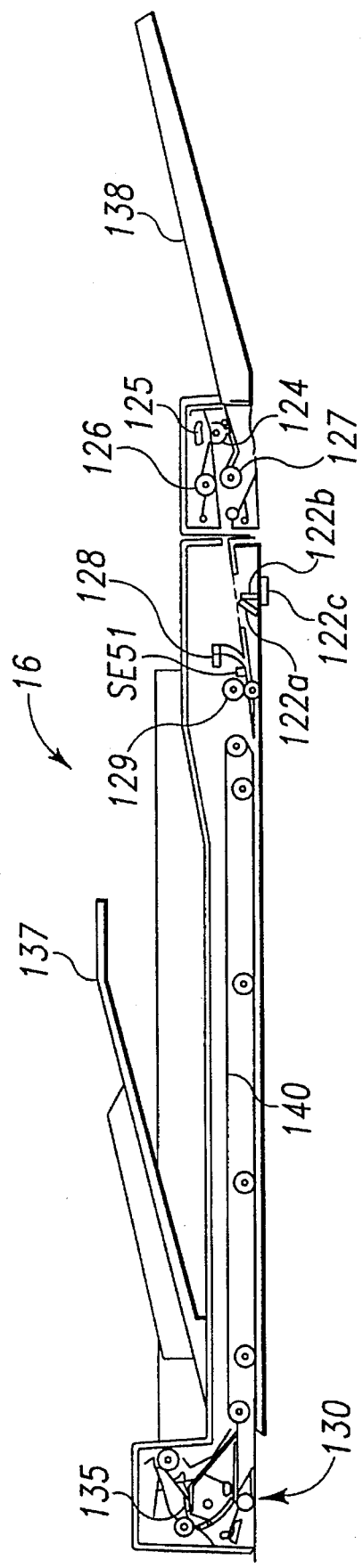
FIG. 2 is a plan view showing the construction of an automatic document feeder (ADF) of the apparatus of the present invention.

FIG. 2 shows the construction of ADF 16 provided on the color copying apparatus of FIG. 1.

Documents stacked on document tray 138 (the presence of a document(s) is detected by document sensor 125) are sequentially picked up from the uppermost document of the stack via take-up roller 124 and intermediate rollers 126 and 127, so as to be delivered to registration roller 129.

During the aforesaid process, the size of the document in the width direction is detected by document width sensor 128, and document size in the length direction is detected based on the time required for the document leading edge to trailing edge to pass document width sensor 128.

Below the position of document width sensor 128 is provided a color detection device comprising document reading light source 122a, collecting phototransmitter array 122b, and document identification CCD 122c, which is constructed so as to be capable of discriminating whether or not a passing document is a color document or a black and white document, by collecting light emitted from document reading light source 122a after said light is reflected by the surface of the document, said reflected light being collected by collecting phototransmitter array 122b, and read by document identification CCD 122c.

Registration sensor SE51 is provided at a position directly in front of registration roller 129. The rotation and stopping of registration roller 129 is controlled based on the detection signal output by said registration sensor SE51.

A document transported by feed roller 124 and the like which has arrived at registration roller 129 is stopped in contact with said registration roller 129, and is subsequently transported with a predetermined timing on transport belt 140 to a predetermined position after which the document is slightly reversely fed so as to be positioned on the document platen.

When document scanning is completed and a duplex copy mode is selected, the document on the document platen is transported by transport belt 140 to inverting section 130 where said document is inverted front-to-back and again placed on document platen 31. When a one-side mode is selected, the document is discharged to discharge tray 137. The selection of the aforesaid transport paths is accomplished by switching member 135.

Feed roller 124, intermediate rollers 126 and 127, registration roller 129, and transport belt 140 of ADF 16 are actuated by motors (not illustrated) via clutches or the like not shown in the drawings. Thus, the clutches of the aforesaid rollers can be employed intermittently to optionally control the rotation/stopping of the rollers. The amount of actuation of each roller and transport belt 140 (i.e., the distance the document is transported) is measured by counting the pulses generated by the aforesaid motors.

[1-3] Signal Input/Output

Figure 3:
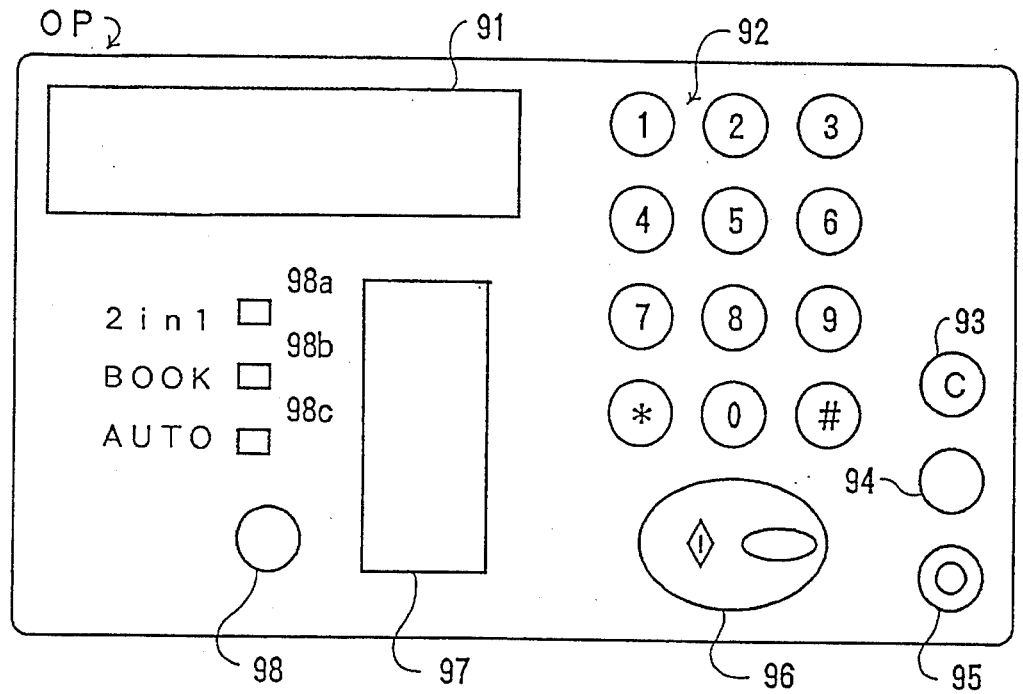
FIG. 3 is an illustration showing the operation panel of the apparatus of the present invention.

FIG. 3 shows the operation panel OP of the copying apparatus of FIG. 1.

Operation panel OP is provided with message display 91, ten-key pad 92 for entering number of copies, magnification and the like, clear key 93 for resetting the copy number to a standard value of one, panel reset key 94 for returning the set values in the copying apparatus to standard values, stop key 95 for stopping a copy operation, copy start key 96, setting section 97 for setting magnification and copy sheets and the like, and mode setting key 98 for selecting two-in-one mode, book divisional mode, autoscan mode, and normal mode in rotating sequence. Display light-emitting diode (LED) 98a lights to indicate the two-in-one mode is selected, LED 98b lights to indicate the book divisional mode is selected, and LED 98c lights to indicate the autoscan mode is selected. The two-in-one mode is a mode for copying two documents placed on the document platen onto a single copy sheet book divisional mode is a mode for separately copying each page of an open book placed on the document platen.

Input signals of the keys on operation panel OP are transmitted to the controller (CPU) shown in FIG. 5, and subsequently key input processing is executed in accordance therewith. The various types of displays on operation panel OP are actuated in accordance with commands issued from the CPU of FIG. 5.

Figure 5:
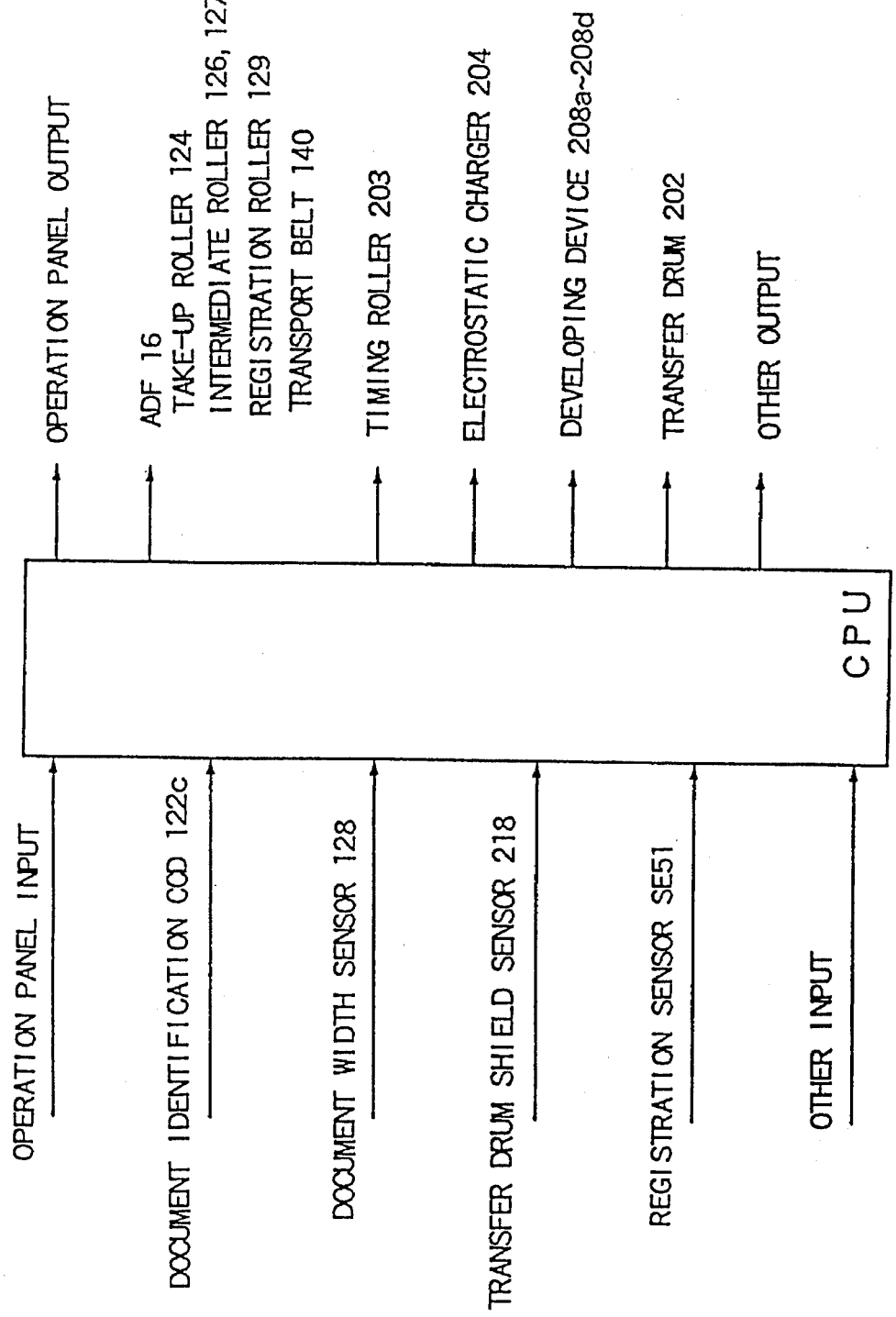
FIG. 5 shows the signal input/output of a controller (CPU) of the apparatus of the present invention.

In addition to input signals from operation panel OP, detection signals from transfer drum shield sensor 218, document width sensor 128, registration sensor SE51, and document identification CCD 122c are input to the CPU shown in FIG. 5.

In addition to output to the various displays of operation panel OP, the CPU of FIG. 5 also outputs signals to control the operation of scanner motor 37, timing roller 203, electrostatic charger 204, transfer charger 205, developing devices 208a~208d, feed roller 124, intermediate rollers 126 and 127, registration roller 129, and transport belt 140.

Control of the copying apparatus is described hereinafter.

Figure 6:
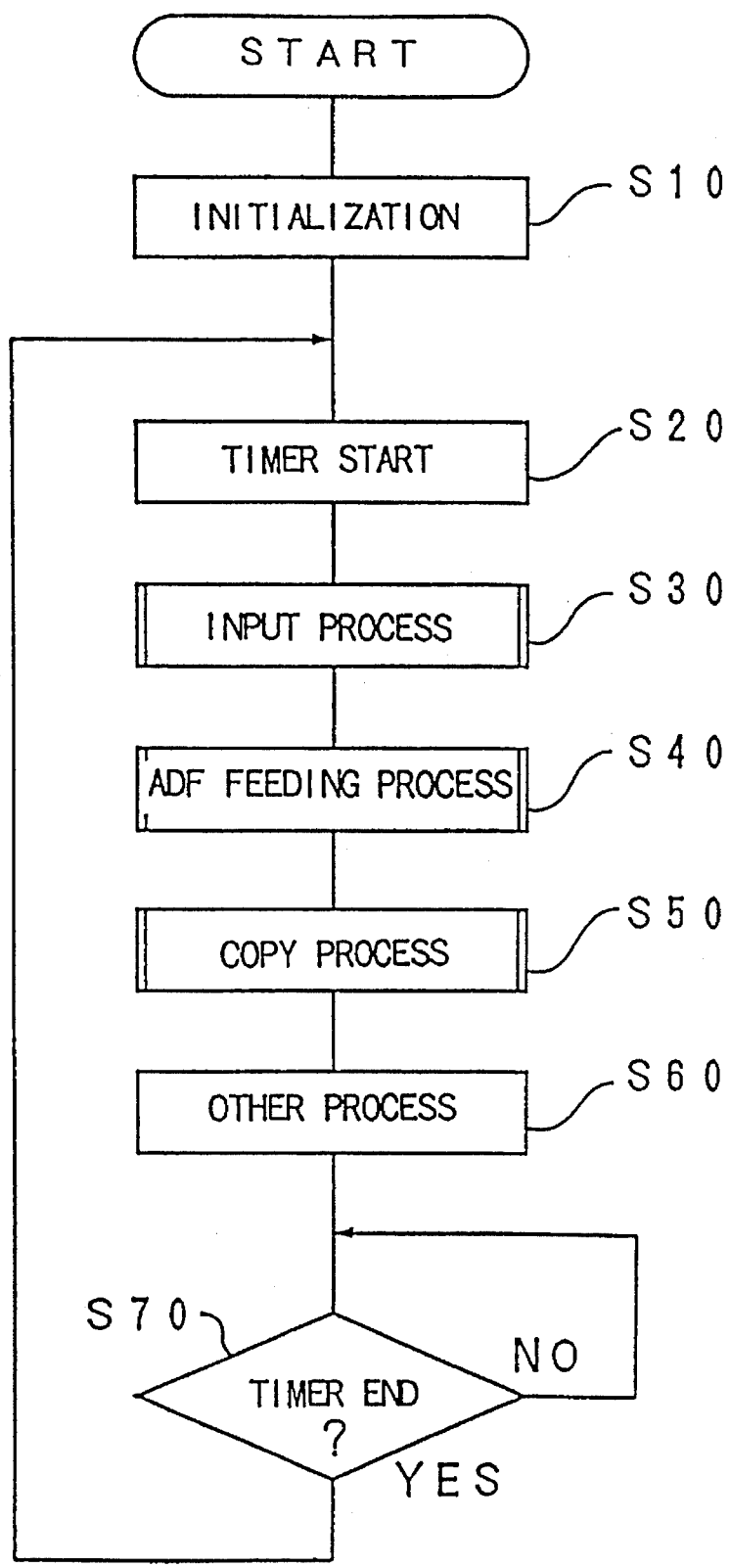
FIG. 6 is a flow chart showing the main routine of the process executed by the CPU of the apparatus of the present invention.

[2-1] Main routine (refer to FIG. 6)

When the CPU starts, an initialization process is executed (S10). For example, flag FF used in the processes described below, and counter SP for controlling the document feed roller, counter SR for controlling the registration roller 129, and counter SF for controlling the transport belt 140 are all set at [0]. Furthermore, the mode is set to normal mode.

After initialization, processes of steps S30~S60 are repeatedly executed each time period (S70: YES) managed by internal timer (S20).

In the input process (S30), processing is executed in accordance with the input of various keys on operation panel OP. Details of this processing is shown in the flow chart of FIG. 7.

In ADF feeding process (S40), processes are executed to place a document set on ADF 16 on the document platen, and discharge said document after scanning is completed. Details of these processes are shown in the flow charts of FIGS. 8–12.

In the copy process (S50), processes for forming copy images on copy sheets are executed in accordance with the type of documents and selected mode. Details of these processes are shown in the flow charts of FIGS. 13–16, and FIGS. 17–21.

Figure 7:
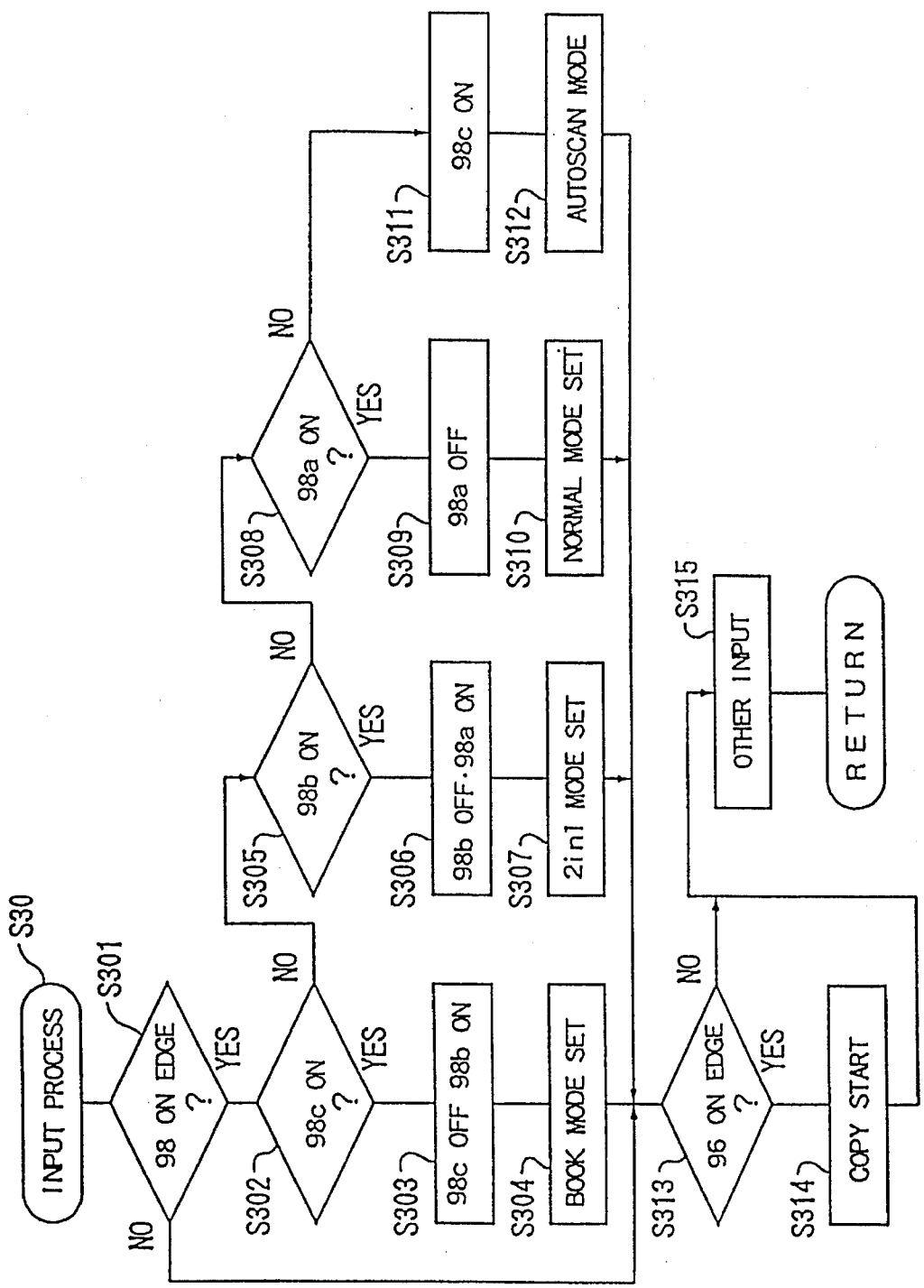
FIG. 7 is a flow chart showing input process (S30) of FIG. 6.

[2-2] Input Process (FIG. 7)

In the input process, the operation mode is selected in rotational sequence, i.e., normal mode→autoscan mode→book divisional mode→two-in-one mode→normal mode, with each input of mode setting key 98.

For example, when mode setting key 98 is detected to be ON-edge (S301: YES) and LED 98a, LED 98b, LED 98c are OFF, i.e., when the normal mode is currently selected (S302: NO; S305: NO; S308: NO), the autoscan mode is set (S312), and the autoscan mode active state is indicated by lighting LED 98c (S311).

Similar processes occur when switching from the autoscan mode to the book divisional mode (S302–S304), from the book divisional mode to the two-in-one mode (S305–S307), and from the two-in-one mode to the normal mode (S308–S310).

When copy start key 96 is operated and the ON-edge state is detected (S313: YES), the copy operation starts (S314).

Step S315 is a step of a batch of processes corresponding to the operation of keys other than mode setting key 98 and copy start key 96.

Figure 8:
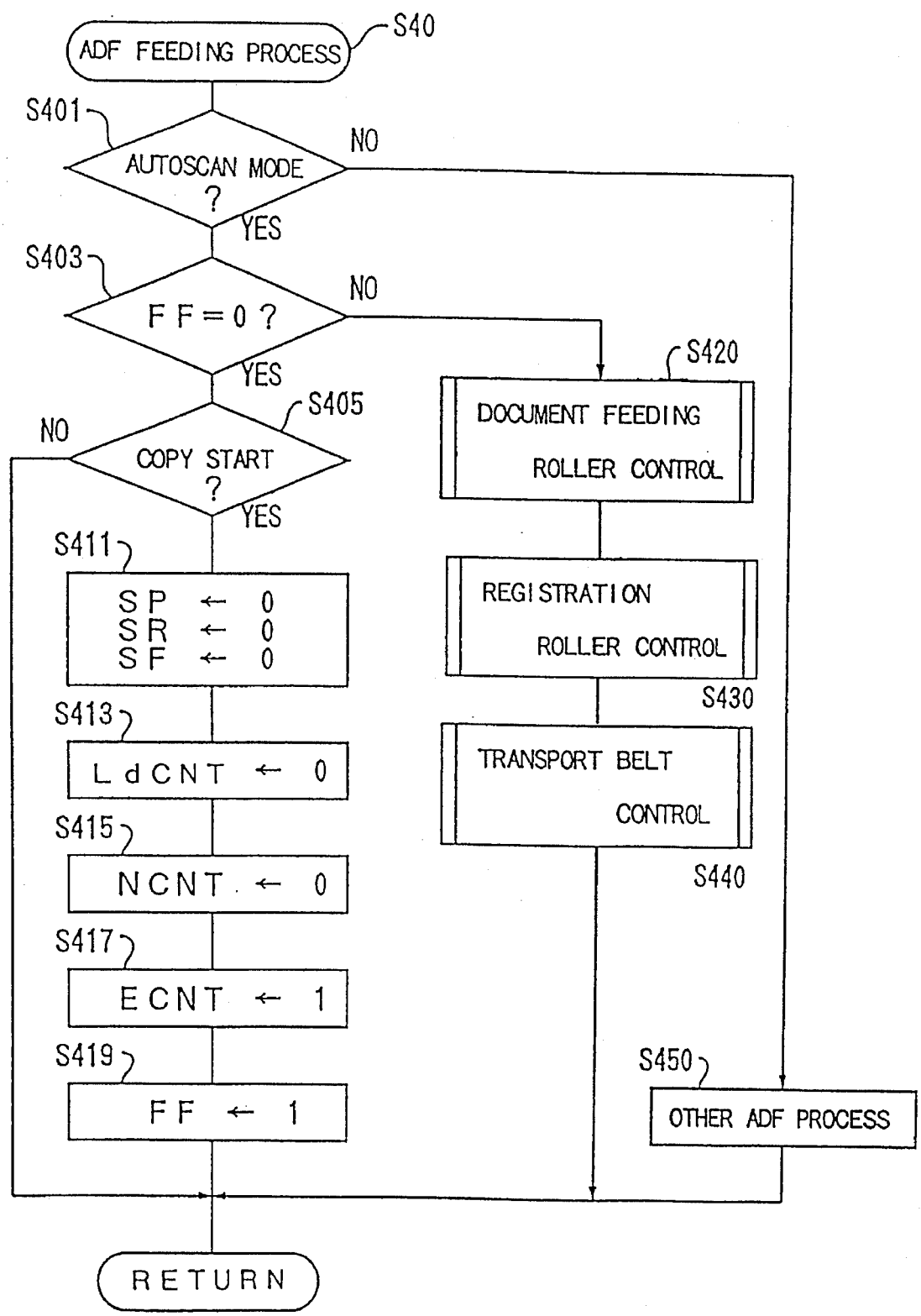
FIG. 8 is a flow chart showing the ADF feeding process (S40) of FIG. 6.

[2-3] ADF Feeding Operation (FIG. 8)

When the autoscan mode is not set (S401: NO), other ADF processing (S450) is executed. This other processing is processing to control ADF 16 and is of a well known method, and, therefore, description of such processing is omitted herefrom.

On the other hand, when the autoscan mode is set (S401: YES; refer to S312), flag FF is checked. Since flag FF is set at [0] (refer to S10), the routine advances to S405. That is, the copy start standby state is set.

In the standby state, when copying starts (S405: YES), the previously mentioned counters SP, SR, and SF are each set at [0] (S411).

Then, the document length counter LdCNT is set at [0] (S413). The document length counter LdCNT is used to measure the length of the document fed by ADF 16.

Furthermore [0] is substituted in variable NCNT (S415). Variable NCNT represents the number of documents fed to document platen 31 but not yet discharged from document platen 31.

Furthermore, [1] is substituted in variable ECNT (S417). Variable ECNT represents the maximum value of the document of document placeable on document platen 31, and is determined in accordance with the document size.

Thereafter, flag FF is set at [1] (S419).

When flag FF is set at [1] (S403: NO), execution of document feed roller control (S420), registration roller control (S430), and transport belt control (S440) are possible. The operations described below are realized via the aforesaid control processes.

Figure 4:
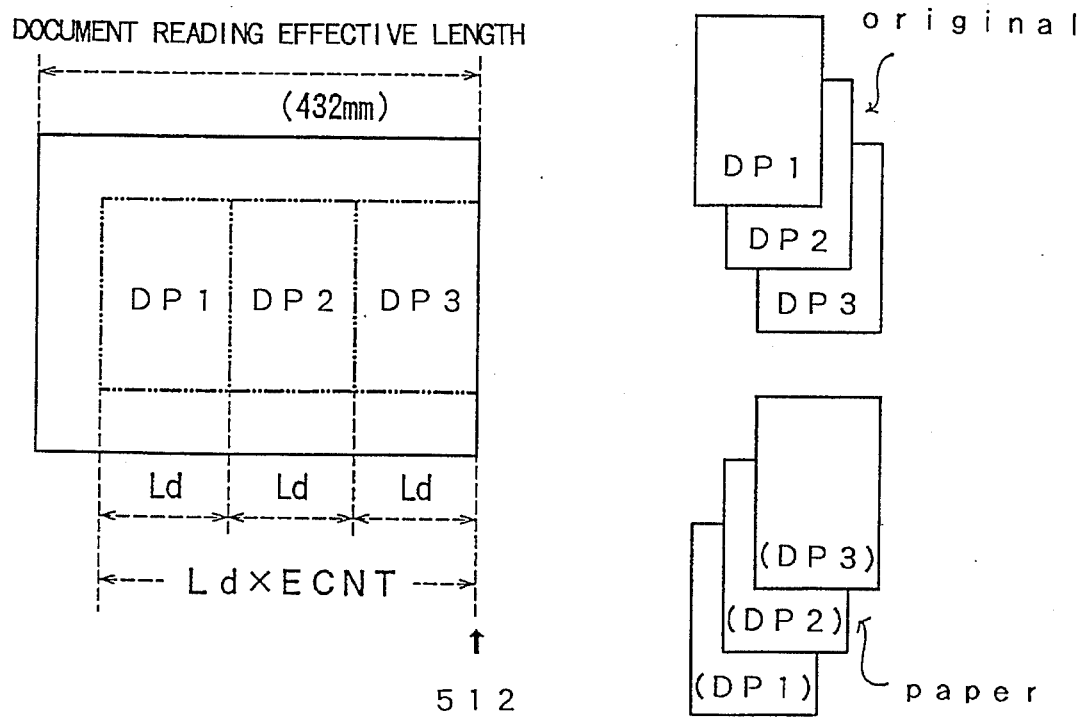
FIG. 4 shows the relationship between document size and position on a document platen in the apparatus of the present invention.

First, document length Ld is detected. As shown in FIG. 4, when the readable document length Ld is ⅓ the effective length of document platen 31 (document reading effective length: 432 mm in the present embodiment), i.e., when three or more documents are arrayed on document platen 31, directly after first document DP1 passes registration roller 129, transport belt 140 is slightly reversely rotated and stopped. Thus, the trailing edge of the first document DP1 is in a state of contact with the registration roller 129. Second document DP2 is fed by feed roller 124 and the like until the leading edge is in contact with registration roller 129. Then, in the aforesaid state, intermediate rollers 126 and 127, registration roller 129, and transport roller 140 are simultaneously actuated in a forward direction. Thus, first document DP1 and second document DP2 are consecutively transported.

When the trailing edge of the last document DP3 simultaneously placeable on the platen passes registration roller 129, transport belt 140 is slightly reversely rotated to position the trailing edge of the last document DP3 at document scale 512 on the right edge of the platen of FIG. 4, and stops. Thus, when the placeable number of documents are arrayed on document platen 31 without spacing therebetween, scanning occurs to read all document at one time. That is, the scanning range is set at (document length Ld)×(number of set documents ECNT). After the scanning (a total of four scans for color documents) is completed, the document on document platen 31 are consecutively discharged to discharge tray 137.

As can be clearly understood from FIG. 4, documents are fed sequentially from first document DP1, and first document DP1 is set at a frontmost position (left in the drawing) on the document platen. Copy sheets are discharged sequentially from the sheet bearing the image of the first document DP1. Scanning is executed in the direction DP3–DP1.

Figure 9:
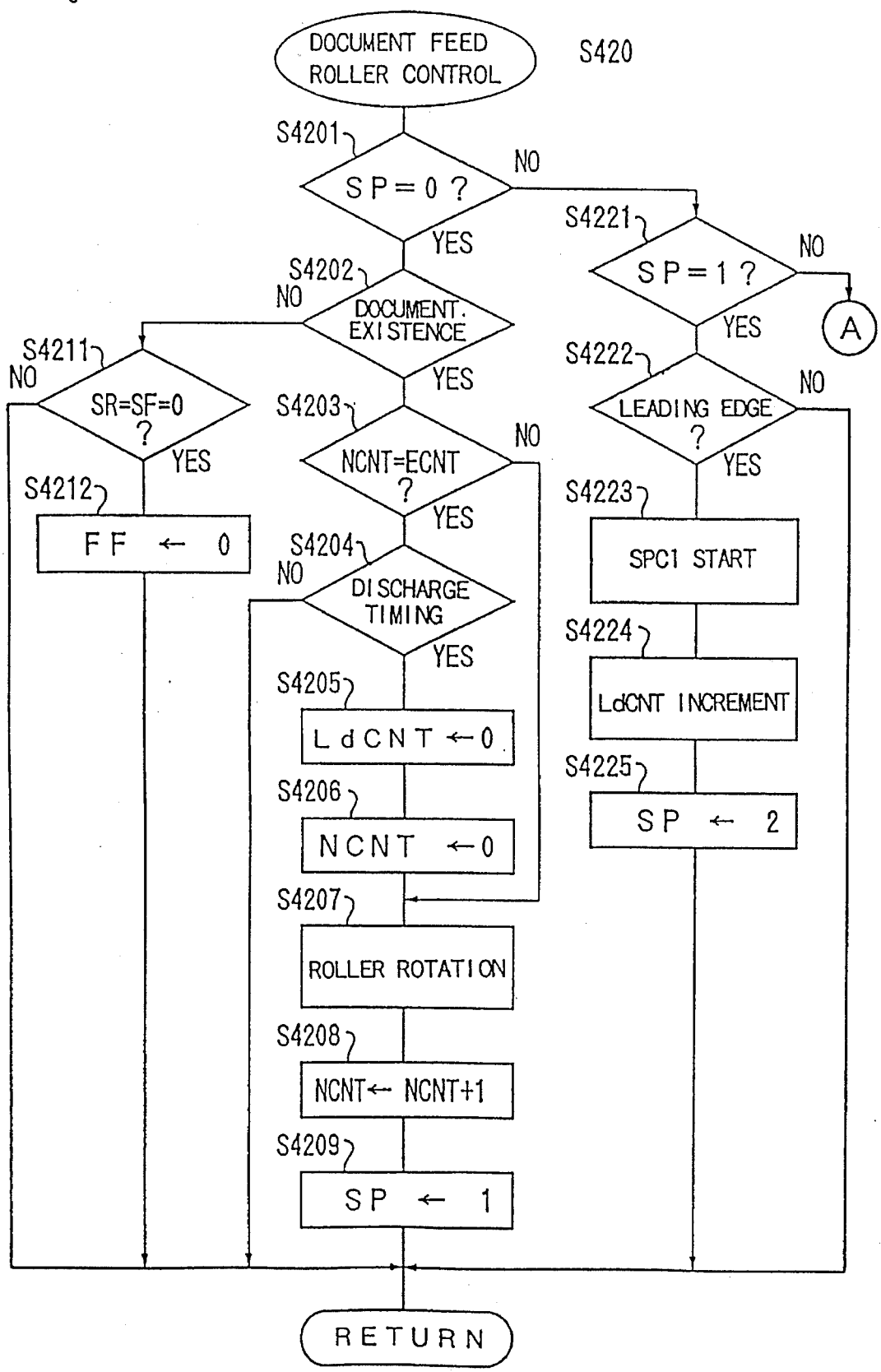
FIG. 9 is a flow chart showing a part of the document feed roller control (S420) of FIG. 8.
Figure 10:
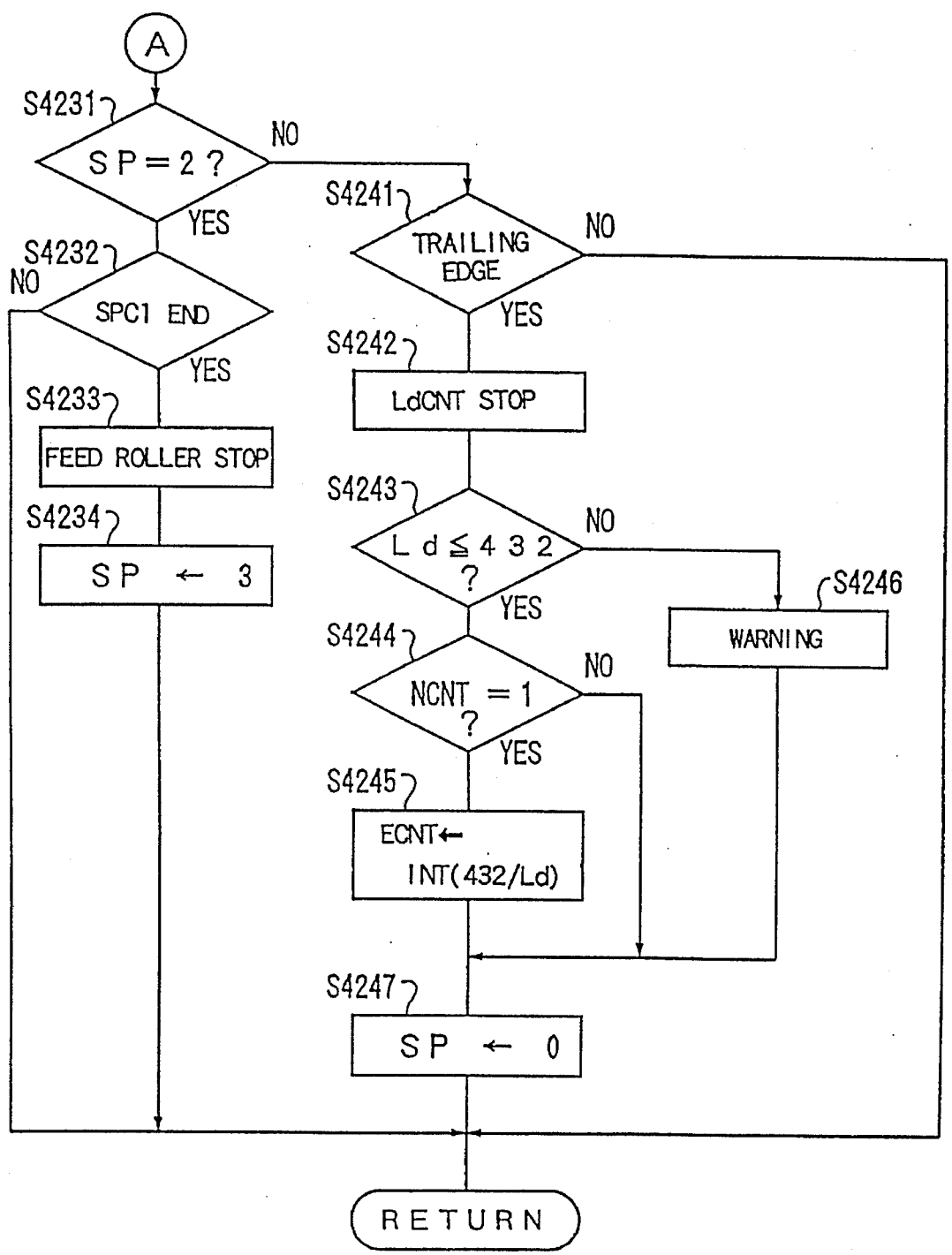
FIG. 10 is a flow chart showing the remaining part of the document feed roller control (S420) of FIG. 8.

[2-3-1] Document Feed Roller Control (FIGS. 9–10)

In document feed roller control, processing is executed to calculate the number of documents placeable in a row on document platen 31 (in order to simplify the following description, the number of placeable documents on document platen 31 shall be two documents for the present embodiment), and successively feed said number of documents from document tray 138.

Initially, counter SP is set at [0] (S4201: YES; refer to S411). It is determined that a document(s) is present on document tray 138 of ADF 16 (S4202: YES).

In this instance a determination is made in step S4203, but at this point in time [0] is substituted in the variable NCNT (refer to S415), and [1] is substituted in variable ECNT (refer to S417). Thus, the determination in step S4203 is NO, and the rotation of feed roller 124 and intermediate rollers 126 and 127 is started (S4207). That is, the feeding of the document from document tray 138 is started. Variable NCNT is incremented [1] (S4208).

Counter SP is set at [1] (S4209).

With counter SP set at [1] (S4221: YES), the passage of the leading edge of the document pasts document width sensor 128 is awaited. When the leading edge of the document is detected by document width sensor 128 (S4222: YES), motor pulse counter SPC1 is started to manage the rotation interrupt time of feed roller 124 (S4223), and document length counter addition operation is started (S4224).

Thereafter, counter SP is set at [2] (S4225).

With counter SP set at [2] (S4231: YES), the completion of the aforesaid motor pulse counter SPC1 is awaited. When the counter is completed (S4232: YES), feed roller 124 is stopped (S4233).

Thereafter, counter SP is set at [3] (S4234).

With counter SP set at [3] (S4231: NO), the passage of the trailing edge of the document past document width sensor 128 is awaited. When the trailing edge of the document is detected by document width sensor 128 (S4241: YES), the count of document length counter is stopped (S4242), and a determination is made as to whether or not the length of the document is less than 432 mm based on said count value (S4243). The document length counter is cleared only in steps S413 or S4205. Accordingly, the final count value indicates the document length (scanning range) to be read consecutively in a single scan.

In the determination of step S4243, if the document length is less than 432 mm (S4243: YES), variable NCNT is set at [1] at this point in time (S4244: YES; refer to S4208), such that an integer ([2] in the present embodiment) derived by dividing 432 mm by the document length calculated by the document length counter .(length of one document) is substituted in variable ECNT (S4245). That is, variable ECNT is incremented to [2].

Thereafter, counter SP is set at [0] (S4247).

When the document length in step S4243 exceeds 432 mm (S4243: NO), an abnormal situation occurs, and the document on document platen 31 is discharged and a warning executed because the document cannot be read normally (S4246).

A first document is fed, and when counter SP is returned to [0] (S4201: YES), a second document is fed by the same procedure as the first document.

Feed roller 124 and intermediate rollers 126 and 127 start rotation in the same manner as for the first document (S4207). Variable NCNT is incremented [1] (S4208), and in the present instance becomes [2].

When awaiting the passage of the leading edge of the document past document width sensor 128 with SP=1 (S4222: YES), motor pulse counter SPC1 is started (S4223) in the same manner as for the first document, and document length counter addition operation is restarted (S4224).

When motor pulse counter SPC1 is completed during standby with SP=2 (S4232: YES), feed roller is stopped (S4233).

When the trailing edge of the document passes document width sensor 128 during standby with SP=3 (S4242), document length counter is again stopped (S4242). Under the condition that the value of the aforesaid counter is normal (S4243: YES), the routine advances to step S4244.

Variable NCNT is determined in step S4244, and since said variable NCNT is [2] in the present instance (S4244: NO; refer to S4208), the counter SP is directly returned to [0] without advancing to step S4245 (S4247).

When the maximum number of document, i.e., two documents, placeable on document platen 31 are fed and counter SP is returned to [0] (S4201: YES), the document discharge start timing is awaited at this time (S4204).

Thereafter, when the document discharge timing starts (S4204: YES), document length counter (S4205) and variable NCNT (S4206) are set at [0], and thereafter feed roller 124 and intermediate rollers 126 and 127 start rotation (S4207). Variable NCNT is incremented [1] (S4208) and set at [1].

When there is no document present on document tray 138 when counter SP has been returned to [0] (S4202: NO), the return to [0] of counter SR and counter SF is awaited (S4211: YES), and flag FF is set at [0] (S4212).

Figure 11:
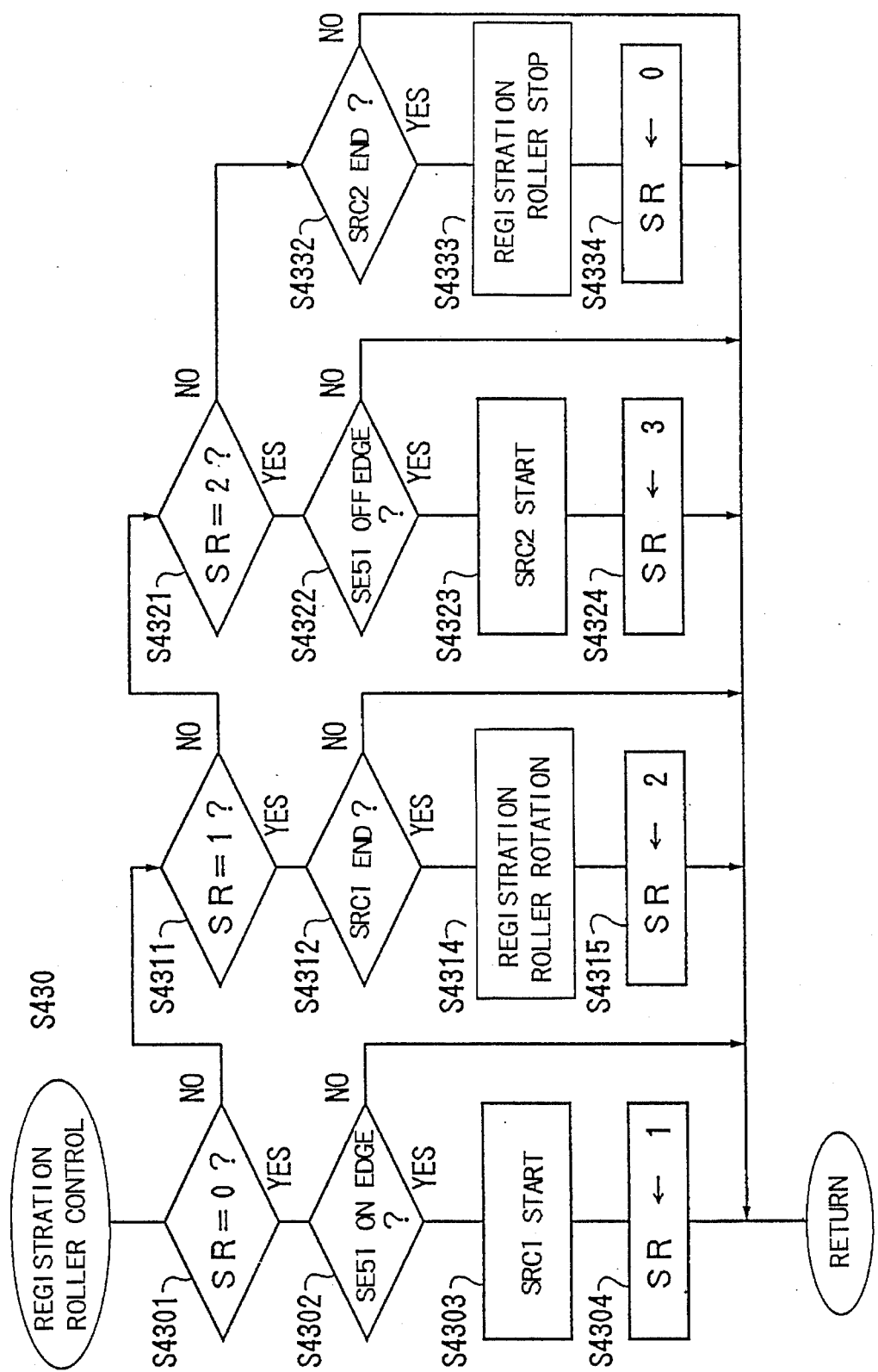
FIG. 11 is a flow chart showing registration roller control (S430) of FIG. 8.

[2-3-2] Registration Roller Control (FIG. 11)

In registration roller control, rotation of the registration roller 129 is started after the elapse of a predetermined time (SRC1 time) following the detection of the leading edge of a document by registration sensor SE51, and registration roller 129 is stopped after a elapse of a predetermined time (SRC2 time) following the detection of the trailing edge of a document by registration sensor SE51. Thus, skewing of a document fed by feed roller 124 can be corrected by the aforesaid control.

With counter SR set at [0] (S4301: YES), the passage of the document leading edge past registration sensor SE51 is awaited. When the leading edge of the document is detected by registration sensor SE51 (S4302: YES), counter SRC1 is started to manage the rotation start time of registration roller 129 (S4303).

Thereafter, counter SR is set at [1] (S4304).

With counter SR set at [1] (S4311: YES), the completion of motor pulse counter SRC1 is awaited. When counter SRC1 completion occurs (S4312: YES), the rotation of registration roller 129 is started (S4314). Since the rotation start time of registration roller 129 is controlled by motor pulse counter SRC1, the document forms a loop with the leading edge of said document abutting registration roller 129.

Thereafter, counter SR is set at [2] (S4315).

With counter SR set at [2] (S4321: YES), the passage of the trailing edge of the document past registration sensor SE51 is awaited. When the trailing edge of the document is detected by registration sensor SE51 (S4322: YES), motor pulse counter SRC2 is started to manage the rotation interrupt time of registration roller 129 (S4323).

Thereafter, counter SR is set at [3] (S4324).

With counter SR set at [3] (S4321: NO), the completion of the motor pulse counter SRC2 is awaited. When counter SRC2 completion occurs (S4332: YES), the rotation of registration roller 129 is stopped (S4333).

Thereafter, counter SR is returned to [0] (S4315).

Figure 12:
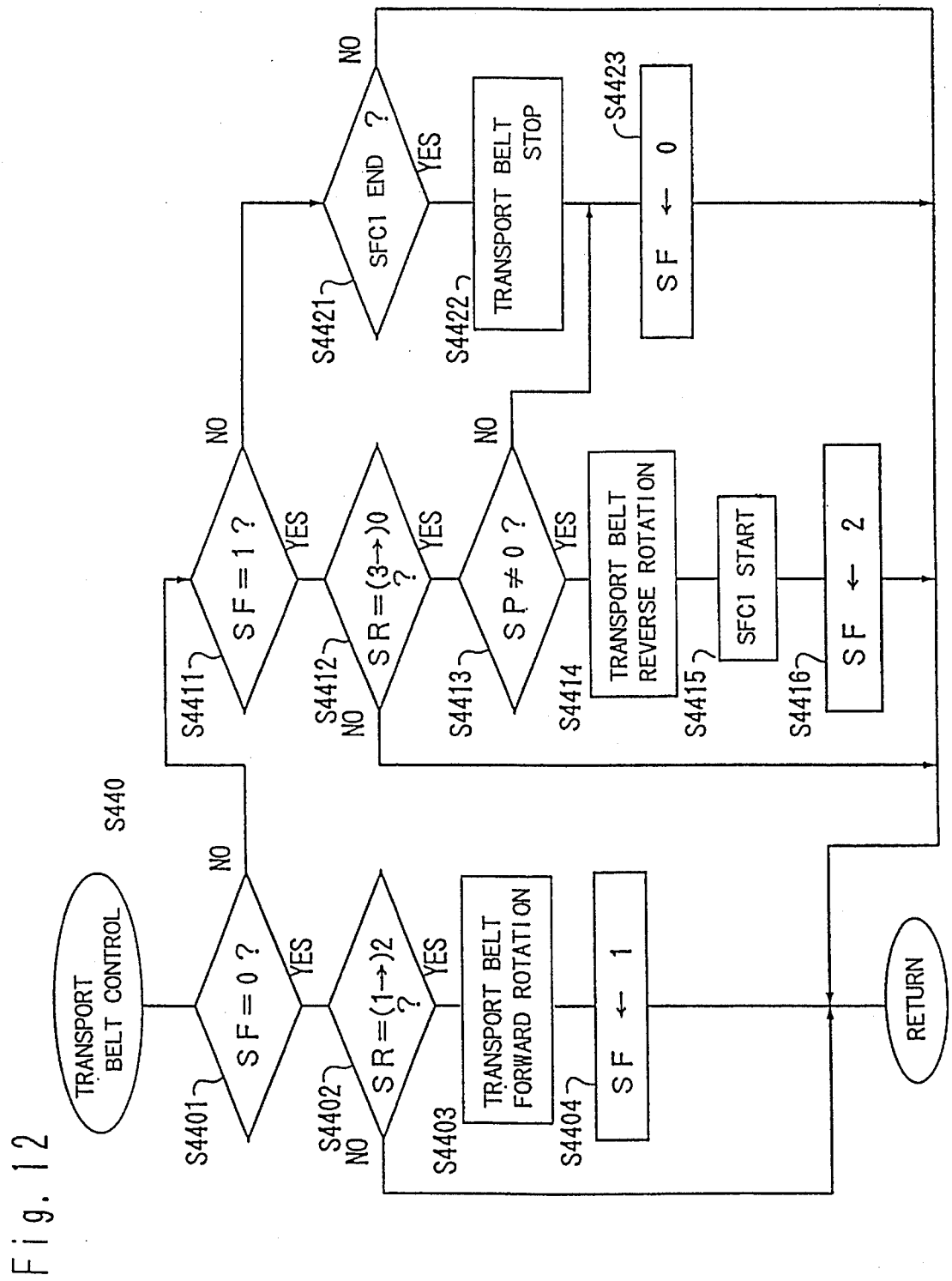
FIG. 12 is a flow chart showing transport belt control (S440) of FIG. 8.

[2-3-3] Transport Belt Control (FIG. 12)

In transport belt control, transport belt 140 starts forward rotation in the same manner as registration roller 129 starts rotation. If a document is currently being fed at the time registration roller 129 stops rotation, transport belt 140 starts reverse rotation, and after a predetermined time (SFC1 time) transport belt 140 is stopped. This process arranges first and second documents in a row on document platen 31 with no gap therebetween.

With counter SF set at [0] (S4401: YES), the start of rotation of registration roller 129 is awaited. When counter SR changes from [1] to [2] by the start of rotation of registration roller 129 (S4402: YES; refer to S4334), transport belt 140 starts forward rotation (S4403).

Thereafter, counter SF is set at [1] (S4404).

With counter SF set at [1] (S4411: YES), the stopping of rotation of registration roller 129 is awaited. When counter SR changes from [3] to [0] by the stopping of rotation of registration roller 129 (S4412: YES; refer to S4334), transport belt 140 starts reverse rotation (S4403) under the condition that counter SP is not set at [0], i.e, a second document is not being transported (S4413: YES). Furthermore, motor pulse counter SFC1 is started to manage the reverse rotation interrupt time of transport belt 140 (S4415).

Thereafter, counter SF is set at [2] (S4416).

With counter SF set at [2] (S4411: NO), the completion of motor pulse counter SFC1 is awaited. When the counter ends (S4421: YES), reverse rotation of transport belt 140 stops (S4422). Thus, the trailing edge of a first document abuts registration roller 129. Accordingly, when transport of a second document starts, transport continues with first and second documents in a consecutive state.

Thereafter, counter SF is returned to [0] (S4423).

When registration roller 129 is not rotating (S4412: YES) and a second document is not being transported (S4413: NO), counter SF is directly returned to [0] (S4423). Positioning of the documents is accomplished by another process.

Figure 13:
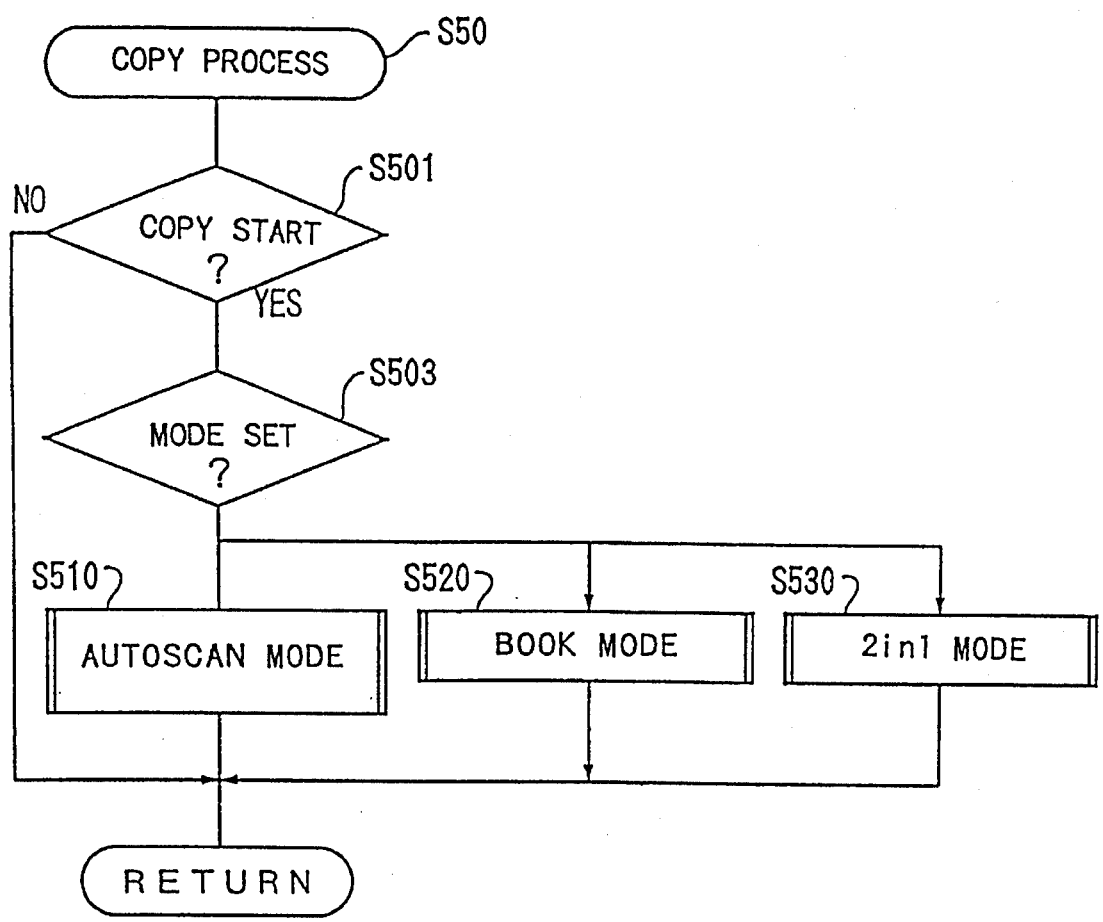
FIG. 13 is a flow chart showing copy process (S50) of FIG. 6.

[2-4] Copy Process (FIG. 13)

In the copy process, when copying is started (S501: YES), the set mode is determined (S503), and a copy process is executed in accordance with each mode (i.e., autoscan mode process/book divisional mode process/two-in-one mode process), and copying operations are executed accordingly.

Figure 14:
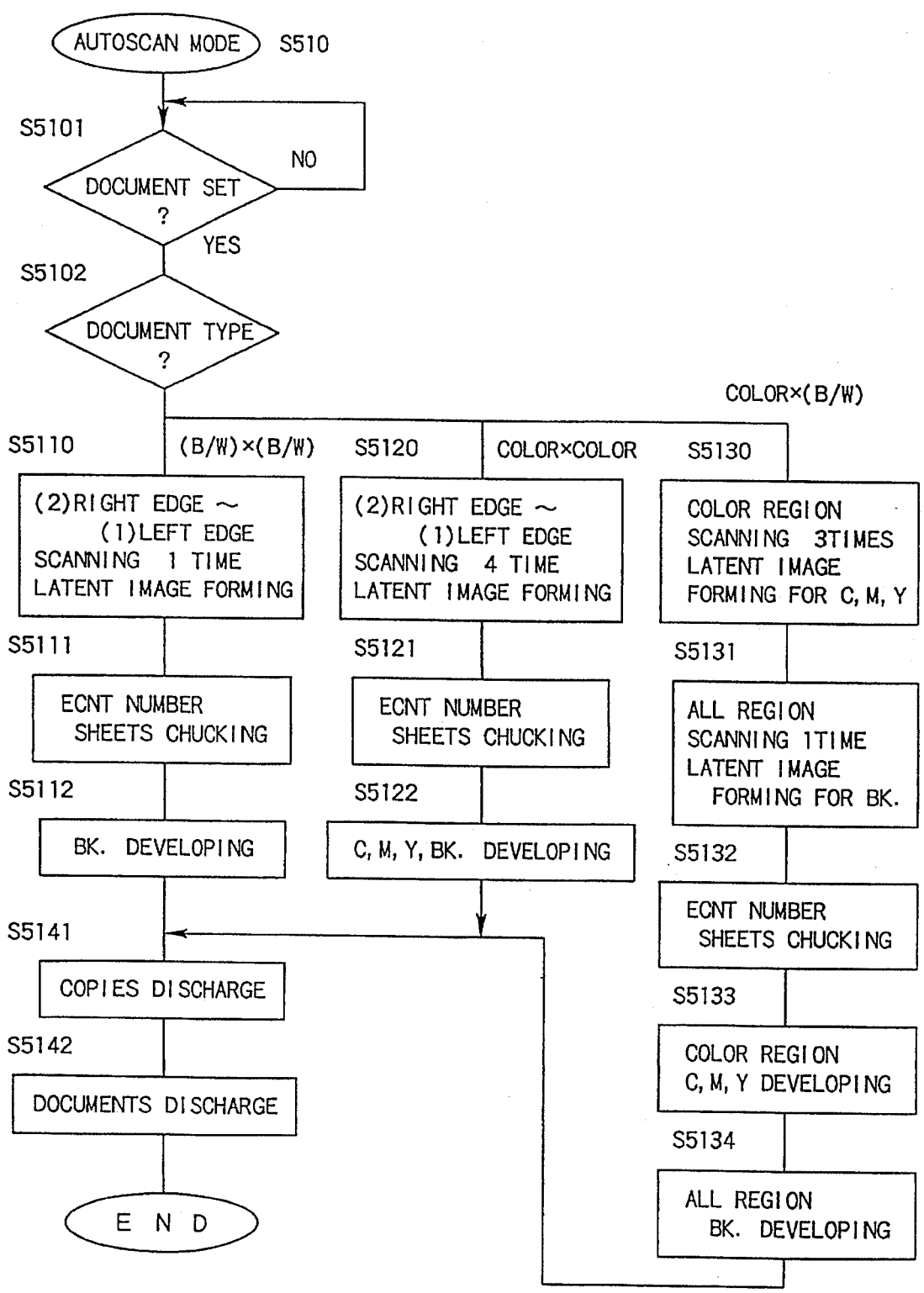
FIG. 14 is a flow chart illustrating the main portion of operations realized by the process of the autoscan mode (S510) of FIG. 13.

[2-4-1] Autoscan Mode (FIG. 14, FIGS. 17–18)

FIG. 14 briefly shows the operation for achieved by the process executed in step S510 (autoscan mode process).

When document feeding is completed in the autoscan mode and the ECNT number of documents (two documents in the present embodiment) are arranged at predetermined positions on the document platen as shown in FIG. 17B (S5101: YES), a determination is made as to whether or not the fed documents are color documents or black and white documents (S5102). This determination is based on signals detected by document identification CCD 122c during document feeding by ADF 16.

[2-4-1-1] (Black and White)×(Black and White)

When first document (1) and second document (2) are both detected as black and white documents as shown in FIG. 18A, a scan range from the right edge of second document (2) to the left edge of first document (1) is scanned in a single scan, and electrostatic latent images are formed on photosensitive drum 206 based on said read image data via the same latent image forming operation, and said electrostatic latent images are developed by black toner of black developing device 208d via the same developing operation (refer to S5112).

Two copy sheets (ECNT number) corresponding to first document (1) and second document (2) are chucked in a row on the surface of transfer drum 202 (refer to S5111).

First document (1) is the document transported first, and second document (2) is the second document transported, and are defined as the left edge and right edge as shown in FIGS. 17–21.

Each black toner image corresponding to the first document (1) and second document (2) visible on photosensitive drum 206 is transferred onto two copy sheets chucked on transfer drum 202 via the same transfer operation. The black toner image corresponding to first document (1) is transferred onto a first copy sheet, and the black toner image corresponding to second document (2) is transferred onto a second copy sheet.

After the black toner images are transferred, the two copy sheets are sequentially transported to fixing devices 210a and 210b where they are subjected to a fixing process, after which said copy sheets are discharged to discharge tray 211 (S5141).

On the other hand, the two documents arranged on document platen 31 are discharged after completion of a single scan via the ADF feeding process (S5142).

In the aforesaid operation, a predetermined spacing is provided between the plurality of copy sheets chucked on transfer drum 202, and the timing of scanning, electrostatic latent image formation, and developing operations are controlled in accordance with said spacing. This arrangement is also the case in each of the instances described below. Furthermore, a spacing may be provided between documents in the ADF feeding process (FIGS. 8–12).

[2-4-1-2] (Color)×(Color)

When the first document (1) and second document (2) are both found to be color document in the determination of step S5102, the first document (1) and second document (2) are read in a single scan (the scanning range being from the right edge of the second document (2) to the left edge of the first document (1)) and electrostatic latent images are formed on the surface of photosensitive drum 206 via a single latent image forming operation based on the aforesaid read image data, and said electrostatic latent images are developed by cyan toner of cyan developing device 208a in a single developing operation. Then, first document (1) and second document (2) are read in a single scanning operation and similar electrostatic latent images are formed, and developed by magenta toner of magenta developing device 208b. Then, first document (1) and second document (2) are read in a single scanning operation and similar electrostatic latent images are formed, and developed by yellow toner of yellow developing device 208c. Finally, first document (1) and second document (2) are read in a single scanning operation and similar electrostatic latent images are formed, and developed by black toner of black developing device 208d (refer to S5122). That is, four individual operations are formed as shown in FIG. 17B.

Two (ECNT number) copy sheets corresponding to the aforesaid first document (1) and second document (2) are chucked on transfer drum 202 (refer to S5121).

The cyan toner image, magenta toner image, yellow toner image, and black toner image rendered visible on the surface of photosensitive drum 206 via the four scanning, image forming, and developing operations previously described are transferred onto two copy sheets chucked on transfer drum 202 by individual transfer operations for each transfer. That is, a total of four transfer operations are accomplished. Thus, the color toner images corresponding to a first document (1) are transferred onto a first copy sheet, and color toner images corresponding to a second document (2) are transferred onto a second copy sheet.

After the color image transfer, the two copy sheets are sequentially transported to fixing devices 210a and 210b where they are subjected to a fixing process, and thereafter discharged to discharge tray 211 (S5141).

On the other hand, after scanning (the fourth single scan) is completed, the two document placed on document platen 31 are discharged via the ADF 16 feeding process (S5142).

[2-4-1-3] (Color)×(Black and White)

When it is found that a first document (1) is a color document and a second document (2) is a black and white document in the determination of step S5102, color first document (1), is read (scanning range from the right edge of first document (1) to the left edge thereof from Ld to 2Ld) and an electrostatic latent image is formed at a first document position on the surface of photosensitive drum 206 based on the aforesaid read image data, and said latent image is developed by cyan toner of cyan developing device 208a. Then, the first document (1) is similarly read and an electrostatic latent image is similarly formed and developed by magenta toner of magenta developing device 208b. Then, the first document (1) is similarly read and an electrostatic latent image is similarly formed and developed by yellow toner of yellow developing device 208c (refer to S5133). Finally, both first document (1) and second document (2) are read in a single scan, an electrostatic latent images are formed on the surface of photosensitive drum 206 based on said read image data via a single electrostatic latent image forming operation, said latent images then are developed by black toner of black developing device 208d in a single developing operation (refer to S5134). That is, there are three operations executed using first document (1), followed by a single operation, as shown at the bottom of FIG. 18(C).

The cyan toner image, magenta toner image, and yellow toner image sequentially rendered visible on the surface of photosensitive drum 206 via the three scanning, latent image forming, and developing operations relative to first document (1) as previously described are each transferred onto a copy sheets corresponding to first document (1) among the two copy sheets chucked on transfer drum 202. The black toner images rendered visible on the surface of photosensitive drum 206 via the final scanning, latent image forming, and developing operations relative to first document (1) and second document (2) are transferred onto the two copy sheets chucked on transfer drum 202 via a single transfer operation. Thus, a color toner image corresponding to first document (1) is transferred onto a first copy sheet, and a black toner image corresponding to second document (2) is transferred onto a second copy sheet.

The first copy sheet bearing the transferred color toner image and the second copy sheet bearing the transferred black toner image are sequentially transported to fixing devices 210a and 210b and subjected to a fixing process, after which they are discharged to discharge tray 211 (S5141).

After the final scan (fourth scan) is completed, the two documents arranged on document platen 31 are discharged by the ADF 16 feeding process (S5142).

When first document (1) is a black and white document, and second document (2) is a color document, as shown in FIG. 18(B), operations similar to those previously described are executed, with the exception that the relationship of the positions of the black and white and color documents are mutually opposite, and the color scanning, latent image forming, developing, and transfer operations are executed relative to second document (2) at position of standard position to Ld, rather than first document (1) at position Ld to 2Ld.

Figure 15:
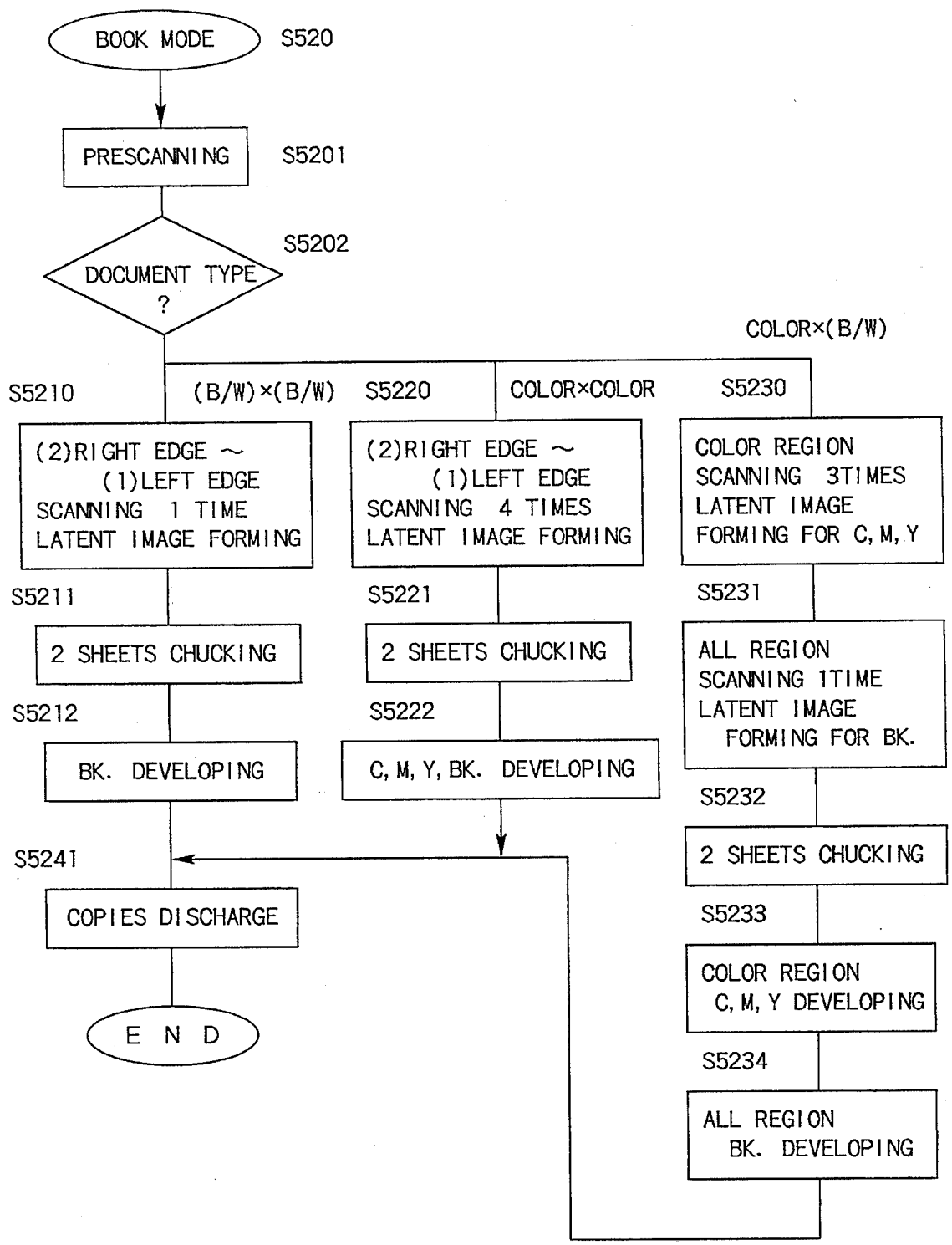
FIG. 15 is a flow chart illustrating the main portion of operations realized by the process of the book divisional mode (S520) of FIG. 13.

[2-4-2] Book Divisional Mode (FIGS. 15 and 20)

FIG. 15 briefly shows the operation realized by the process executed in step S520 (Book divisional mode process).

When the book divisional mode is selected, the entire scanning range is prescanned (S5201), and the size of ½ (i.e., size of one page) of the book document placed on document platen 31 is detected, and a determination is made as to whether or not said document is a color document or black and white document (S5202). This determination is accomplished by image process section 10. The prescan range is the entire range of the document platen.

[2-4-2-1] (Black and White)×(Black and White)

When the first page (1) and second page (2) documents are both found to be black and white documents via the prescan, as shown at the top of FIG. 20(B), first page (1) and second page (2) are read (scanning range being from the right edge of second page (2) to the left edge of first page (1)) by the same scan and electrostatic latent images are formed on the surface of photosensitive drum 206 by the same latent image forming operation based on said read image data, and said latent images are developed by black toner of black developing device 208d in the same developing operation (refer to S5212).

Two copy sheets P1 and P2 of sizes corresponding to first page (1) and second page (2) are chucked on transfer drum 202 with no gaps therebetween, as shown in FIG. 19(B) (refer to S5211). The size of the copy sheets chucked on transfer drum 202 is a multiple of the copy magnification of each page.

The black toner images of first page (1) and second page (2) rendered visible on the surface of photosensitive drum as previously described are transferred onto two copy sheets P1 and P2 chucked on transfer drum 202 via a single transfer operation. Thus, the black toner image corresponding to first page (1) is transferred onto a first copy sheet, and the black toner image corresponding to second page (2) is transferred onto a second copy sheet.

The two copy sheets bearing the transferred black toner images are sequentially transported to fixing device 210a and 210b and subjected to a fixing operation, and thereafter discharged to discharge tray 211 (S5241).

[2-4-2-2] (Color)×(Color)

When the documents of first page (1) and second page (2) are both found to be color documents in the determination of step S5202, as shown in FIG. 20(A), first page (1) and second page (2) are read in a single scan, and electrostatic latent images are formed on the surface of photosensitive drum 206 in a single latent image forming operation based on the read image data, and the latent images are developed by cyan toner of cyan developing device 208a in a single developing operation. Then, first page (1) and second page (2) are read in a single scanning operation, and electrostatic latent images similarly formed, and developed by magenta toner of magenta developing device 208b. Then, first page (1) and second page (2) are read in a single scanning operation, and electrostatic latent images similarly formed, and developed by yellow toner of yellow developing device 208c. Finally, first page (1) and second page (2) are read in a single scanning operation, and electrostatic latent images similarly formed, and developed by black toner of black developing device 208d (refer to S5223). That is, four individual operations are performed.

Two copy sheets of sizes corresponding to first page (1) and second page (2) are chucked on transfer drum 202 without a gap therebetween similar to the previously described instance of (black and white)×(black and white) documents (refer to S5221).

The cyan toner image, magenta toner image, yellow toner image, and black toner image sequentially rendered visible on the surface of photosensitive drum 206 via the four scanning, latent image forming, and developing operations as previously described are each transferred onto two copy sheets chucked on transfer drum 202 in individual transfer operations. That is, a total of four transfer operations are performed. Thus, the color toner image corresponding to first page (1) are transferred onto a first copy sheet, and the color toner image corresponding to second page (2) is transferred onto a second copy sheet.

The two copy sheets bearing the transferred color toner images are sequentially transported to fixing devices 210a and 210b, and thereafter discharged to discharge tray 211 (S5241).

[2-4-2-3] (Color)×(Black and White)

When the document of first page (1) is found to be a color document and the document of second page (2) is found to be a black and white document in the determination of step S5202, as shown in FIG. 20(D), first page (1) is read (scanning range from the right edge to left edge of first page (1)), an electrostatic latent image is formed at the first page position on the surface of photosensitive drum 206 based on the read image data, and said latent image is developed by cyan toner of cyan developing device 208a. Then, first page (1) similarly read and an electrostatic latent image is similarly formed and developed by magenta toner of magenta developing device 208b. Then, first page (1) similarly read and an electrostatic latent image is similarly formed and developed by yellow toner of yellow developing device 208c (refer to S5233). Finally, both first page (1) and second page (2) are read in a single scan (scanning range is the right edge of the second page (2) to the left edge of the first page (1)), electrostatic latent images are formed on the surface of photosensitive drum 206 in a single latent image forming operation based on the read image data, and said latent images are developed by black toner of black developing device 208d in a single developing operation (refer to S5234). That is, there are three operations executed using color first page (1), followed by a single operation, as shown in FIG. 20(D).

Two copy sheets corresponding in size to first page (1) and second page (2) are chucked on transfer drum 202 (refer to S5232).

The cyan toner image, magenta toner image, and yellow toner image sequentially rendered visible on the surface of photosensitive drum 206 via the three scanning, latent image forming, and developing operations relative to first page (1) as previously described are each transferred onto two copy sheets chucked on transfer drum 202 in individual transfer operations. The black toner images rendered visible on the surface of photosensitive drum 206 via the final scanning, latent image forming, and developing operation relative to first page (1) and second page (2) are transferred onto two copy sheets chucked on transfer drum 202 via a single transfer operation. Thus, a color toner image corresponding to first page (1) is transferred onto a first transfer sheet, and a black toner image corresponding to second page (2) is transferred onto a second transfer sheet.

The first copy sheet bearing the transferred color toner image and the second copy sheet bearing the transferred black toner image are sequentially transported to fixing devices 210a and 210b where they are subjected to a fixing operation, and thereafter discharged to discharge tray 211 (S5241).

When the document of first page (1) is found to be a black and white document, and the document of second page (2) is found to be a color document in the determination of step S5202, as shown in FIG. 20(C), the same processing is performed as described above, with the exception that the relationship of the black and white and color pages are reversed, such that the first through third scanning, latent image forming, and developing operations for the color page are executed for the right edge to left edge of second page (2).

Thus, in the book divisional mode, when black and white regions and color regions are mixed within a document, three scanning, latent image forming, and developing operations are executed relative to the color region so as to form a cyan/magenta/yellow composite image, and a single scanning, latent image forming, and developing operation is executed relative to both the color region and black and white region so as to form a book-like image, and thereby reduce the time required to complete said operations. The sequence of the previously described operations may of course be changed, e.g., the black operations may be done first.

Figure 16:
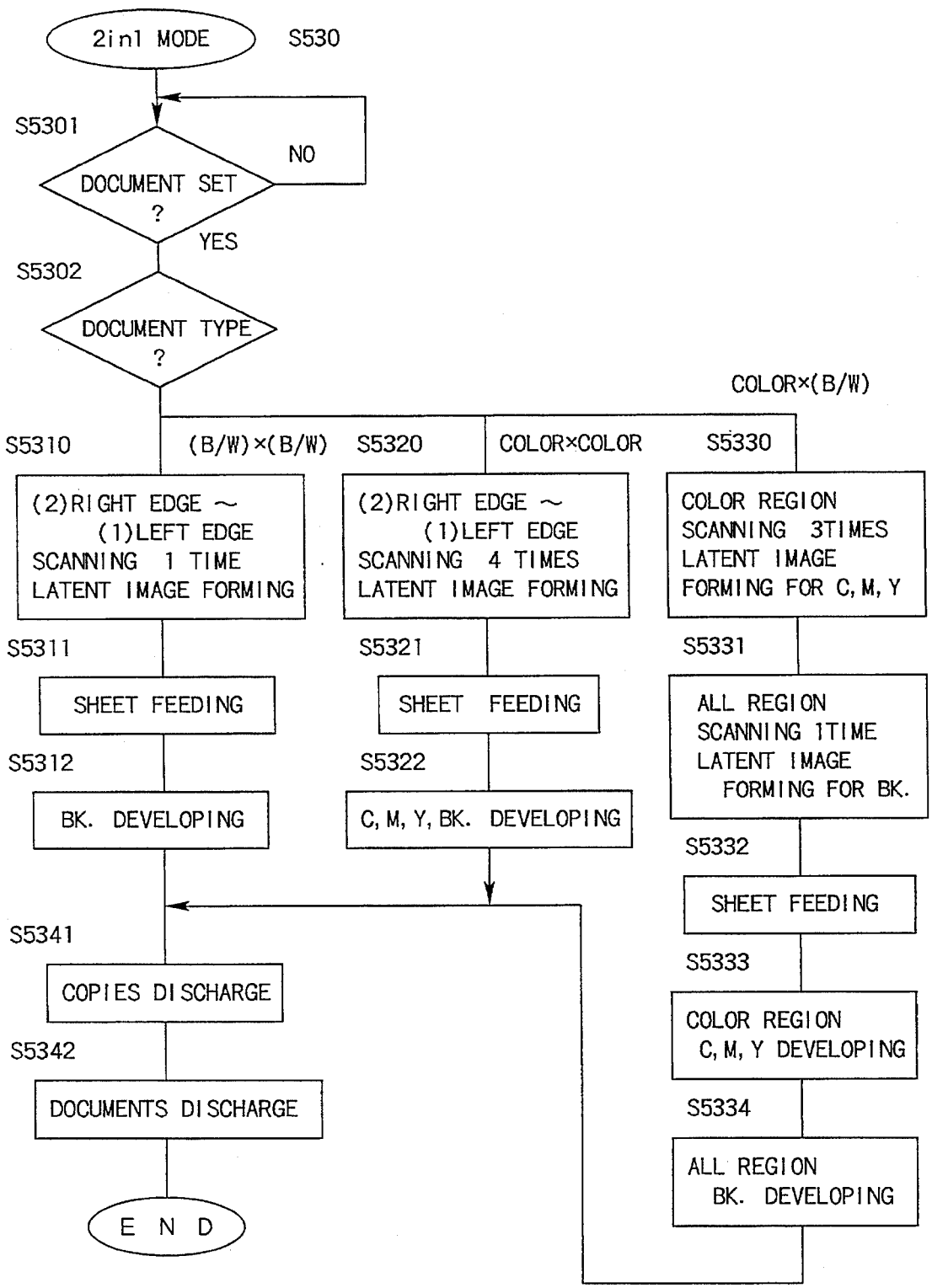
FIG. 16 is a flow chart illustrating the main portion of operations realized by the process of the two-in-one mode (S530) of FIG. 13.

[2-4-3] Two-in-One Mode (FIGS. 16 and 21)

FIG. 16 briefly shows the operation realized by the process executed in step S530 (two-in-one mode process).

When two documents are arranged side by side at predetermined positions on document platen 31 (S5301: YES), a check is made to determine whether or not the two documents are color documents or black and white documents (S5302). This determination is made based on the signals detected by document identification CCD 122c during document feeding when documents are fed by ADF 16. Furthermore, a document(s) is placed on the document platen by an operator, document type discrimination is accomplished by prescanning or via input from the operation panel via an operator.

In the two-in-one mode, when first document (1) and second document (2) are both black and white documents, a process is executed which is identical to the process (black and white)×(black and white) control [refer to section 2-4-1-1] of the previously described autoscan mode (refer to FIG. 21(B)).

At this time, copy sheet P chucked on transfer drum 202 is of a size corresponding to the two documents, i.e., first document (1) and second document (2). When copy magnification is 1:1, the copy sheet size is the size of the side-by-side first document (1) and second document (2). When copy magnification not 1:1, the copy sheet size is a multiple of the copy magnification of side-by-side first (1) and second document (2).

When both first document (1) and second document (2) are color documents, a process is executed which is identical to the process (color)×(color) control [refer to section 2-4-1-2] of the previously described autoscan mode (refer to FIG. 21(B)). When the first document (1) is a color document and second document (2) is a black and white document (refer to FIG. 21(C)), or when the first document (1) is a black and white document and second document (2) is a color document (refer to FIG. 21(D)), a process is executed which is identical to the process (color)×(black and white) control [refer to section 2-4-1-3] of the previously described autoscan mode.

Thus, in the two-in-one mode, when there is a mixture of black and white and color documents, three scanning, latent image forming, and developing operations are performed relative to a color document to form a cyan/magenta/yellow composite image, whereas a single scanning, latent image forming, and developing operation is performed relative to a black and white document to form a black image. Therefore, the time required to complete the aforesaid operations is reduced. Furthermore, the sequence of the aforesaid operations may be changed just as in the case of the book divisional mode.

When desiring to realize a combination of the ADF 16 feeding process and the two-in-one mode, controls may be executed so as to chuck a single copy sheet on transfer drum 202 when a two document sheets are fed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image forming apparatus which scans an original document by a scanner and transfers a scanned image onto a copy sheet, said image forming apparatus comprising:

means for setting on a document platen a maximum number of document sheets placeable on said document platen;

a transfer member for supporting a number of copy sheets equal to said maximum number of document sheets placed on said document platen so as to form scanned images of the document sheets onto the supported copy sheets; and detection means for detecting said maximum number of document sheets placeable on said document platen by comparing the size of the document sheets and the document platen size.

2. An image forming apparatus which scans an original document by a scanner and transfers a scanned image onto a copy sheet, said image forming apparatus comprising:

means for setting on a document platen a maximum number of document sheets placeable on said document platen;

a transfer member for supporting a number of copy sheets equal to said maximum number of document sheets placed on said document platen so as to form scanned images of the document sheets onto the supported copy sheets; and means for discriminating whether or not the scanned document sheets contain a color region for each scanned document sheet among a plurality of document sheets placed on said document platen.

3. The image forming apparatus as claimed in claim 2, wherein said scanner executes a single scanning operation for all regions of the document sheets, when all document sheets placed on said document platen are discriminated as being document sheets that do not contain color regions.

4. The image forming apparatus as claimed in claim 2, wherein said scanner executes four scanning operations for all regions of the document sheets, when all document sheets placed on said document platen are discriminated as being documents that contain color regions.

5. The image forming apparatus as claimed in claim 2, wherein said scanner executes a single scanning operation for a document sheet that does not contain a color region and four scanning operations for a document sheet that contains color regions, when said document sheet containing color regions and said document sheet that does not contain color regions are mixed among the plurality of document sheets placed on said document platen.

6. An image forming apparatus which scans an original document by a scanner and transfers a scanned image onto a copy sheet, said image forming apparatus comprising:

means for setting on a document platen a maximum number of document sheets placeable on said document platen; and a transfer member for supporting a number of copy sheets equal to said maximum number of document sheets placed on said document platen so as to form scanned images of the document sheets onto the supported copy sheets;

wherein said maximum number of document sheets are placed on said document platen without spacing therebetween.

7. An image forming apparatus which scans an original document by a scanner and transfers a scanned image onto a copy sheet, said image forming apparatus comprising:

means for setting on a document platen a maximum number of document sheets placeable on said document platen; and a transfer member for supporting a number of copy sheets equal to said maximum number of document sheets placed on said document platen so as to form scanned images of the document sheets onto the supported copy sheets;

wherein said number of copy sheets equal to said maximum number of document sheets placed on said document platen are supported on said transfer member without spacing therebetween.

8. An image forming apparatus which scans an original document by a scanner and transfers a scanned image onto a copy sheet, said image forming apparatus comprising:

a document feeding device for feeding documents onto a document platen, detecting the size of fed documents, and discriminating whether or not said documents contain color regions;

comparison means for comparing the document size and the document platen size;

detection means for detecting a maximum number of documents placeable on said document platen in accordance with said comparison results;

first control means for controlling said document feeding device so as to position said maximum number of documents on said document platen side by side;

a transfer member for supporting a number of copy sheets equal to said maximum number of document placeable on said document platen;

second control means for controlling scanning so as to execute a single scanning operation for document that does not contain color region and four scanning operations for document containing color regions; and image forming means for transferring images scanned by said scanning operations onto transfer sheets supported on said transfer member.

9. The image forming apparatus as claimed in claim 8, wherein said maximum number of document sheets are placed on said document platen without spacing therebetween.

10. The image forming apparatus as claimed in claim 8, wherein said number of copy sheets equal to said maximum number of document sheets placed on said document platen are supported on said transfer member without spacing therebetween.

11. The image forming apparatus as claimed in claim 8, wherein said transfer member supports the copy sheets corresponding to the documents sheets positioned on the document platen, and the scanned image of the document sheet is transferred onto the corresponding copy sheet by said image forming means.

12. An image forming apparatus which scans an original document by a scanner and transfers a scanned image onto a copy sheet, said image forming apparatus comprising:

a document feeding device which feeds documents onto a document platen and detects the size of fed documents;

controller which compares the document size and the document platen size, detects a maximum number of documents placeable on said document platen in accordance with said comparison results and controls said document feeding device so as to position said maximum number of documents on said document platen side by side; and a transfer member which supports a number of copy sheets equal to said maximum number of document placeable on said document platen so as to form the image of the document onto the supported copy sheets.

13. The image forming apparatus as claimed in claim 12, wherein said controller further comprises function of discriminating whether or not the document contains a color region for each document among a plurality of documents placed on said document platen.

14. The image forming apparatus as claimed in claim 13, wherein said scanner executes a single scanning operation for all document regions, when all documents placed on said document platen are discriminated as being documents that do not contain color regions.

15. The image forming apparatus as claimed in claim 13, wherein said scanner executes four scanning operations for all document regions, when all documents placed on said document platen are discriminated as being documents that contain color regions.

16. The image forming apparatus as claimed in claim 13, wherein said scanner executes a single scanning operation for document that does not contain color region and four scanning operations for document that contains color regions, when said document containing color regions and document that does not contain color regions are mixed among the plurality of documents placed on a document platen.

17. The image forming apparatus as claimed in claim 12, wherein said maximum number of document sheets are placed on said document platen without spacing therebetween.

18. The image forming apparatus as claimed in claim 12, wherein said number of copy sheets equal to said maximum number of document sheets placed on said document platen are supported on said transfer member without spacing therebetween.

19. The image forming apparatus as claimed in claim 12, wherein said transfer member supports the copy sheets corresponding to the documents sheets positioned on the document platen, and the scanned image of the document sheet is transferred onto the corresponding copy sheet.

20. An image forming apparatus which scans an original document by a scanner and transfers a scanned image onto a copy sheet, said image forming apparatus comprising:

detection means for detecting a maximum number of documents placeable on a document platen by comparing a document size and a document platen size; and means for setting on said document platen said maximum number of documents placeable on said document platen.

21. An image forming apparatus which scans an original document by a scanner and transfers a scanned image onto a copy sheet, said image forming apparatus comprising:

a document feeding device which feeds documents onto a document platen and detects the size of fed documents; and a controller which compares the document size and the document platen size, detects a maximum number of documents placeable on said document platen in accordance with said comparison results and controls said document feeding device so as to position said maximum number of documents on said document platen side by side.

* * * * *

UNITED STATES PATENT AND TRADEMARK OFFICE
CERTIFICATE OF CORRECTION

PATENT NO. : 5,596,400
DATED : January 21, 1997
INVENTOR(S) : Kasamatsu et al

It is certified that error appears in the above-identified patent and that said Letters Patent is hereby corrected as shown below:

Title page, item [75], delete "Shigio" and insert --Shigeo--.

Signed and Sealed this

Seventeenth Day of March, 1998

Attest:

BRUCE LEHMAN

*Attesting Officer*  *Commissioner of Patents and Trademarks*